(12) United States Patent
Kawai et al.

(10) Patent No.: US 12,060,493 B2
(45) Date of Patent: Aug. 13, 2024

(54) INK SET, IMAGE RECORDING METHOD, AND IMAGE RECORDED MATERIAL

(71) Applicant: FUJIFILM Corporation, Tokyo (JP)

(72) Inventors: Masaharu Kawai, Kanagawa (JP); Ryuji Shinohara, Kanagawa (JP); Yushi Hongo, Kanagawa (JP); Taiga Mizoe, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 305 days.

(21) Appl. No.: 17/475,304

(22) Filed: Sep. 14, 2021

(65) Prior Publication Data
US 2022/0002570 A1 Jan. 6, 2022

Related U.S. Application Data

(63) Continuation of application No. PCT/JP2020/004504, filed on Feb. 6, 2020.

(30) Foreign Application Priority Data

Mar. 28, 2019 (JP) ................. 2019-064596

(51) Int. Cl.
*C09D 11/38* (2014.01)
*B41J 2/21* (2006.01)
(Continued)

(52) U.S. Cl.
CPC ............. *C09D 11/38* (2013.01); *B41J 2/2107* (2013.01); *B41M 5/0017* (2013.01);
(Continued)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS 9,982,153 B2 5/2018 Okuda et al.
10,563,078 B2 2/2020 Okuda et al.
(Continued)

FOREIGN PATENT DOCUMENTS

CN 1464841 12/2003
CN 1612919 5/2005
(Continued)

OTHER PUBLICATIONS

"Office Action of China Counterpart Application", issued on Jun. 22, 2022, with English translation thereof, pp. 1-15.
(Continued)

*Primary Examiner* — Manish S Shah
(74) *Attorney, Agent, or Firm* — JCIPRNET

(57) ABSTRACT

An ink set is an ink set including a treatment liquid having a pH of 4.5 or less or 9.5 or greater, and an ink containing a compound A which generates gas in an environment of a pH of 4.5 or less or 9.5 or greater, a resin, water, and a white pigment and having a pH of greater than 4.5 and less than 9.5, in which a ratio of a content mass of the white pigment to a content mass of the compound A in the ink is 1 or greater and 160 or less.

16 Claims, 2 Drawing Sheets

(51) Int. Cl.
*B41M 5/00* (2006.01)
*C09D 11/322* (2014.01)
*C09D 11/54* (2014.01)

(52) U.S. Cl.
CPC ......... *B41M 5/0023* (2013.01); *C09D 11/322* (2013.01); *C09D 11/54* (2013.01)

(58) Field of Classification Search
CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; B41M 5/0011; B41M 5/0017; B41M 5/0023; B41M 5/0047; B41M 7/00; B41M 7/0072; B41M 5/52; B41M 5/5218; B41M 5/5227
See application file for complete search history.

(56) References Cited

U.S. PATENT DOCUMENTS

| | | | |
|---|---|---|---|
| 10,988,628 | B2 | 4/2021 | Okuda et al. |
| 2004/0032473 | A1 | 2/2004 | Ishimoto et al. |
| 2005/0012798 | A1 | 1/2005 | Adachi et al. |
| 2011/0043578 | A1 | 2/2011 | Tojo |
| 2011/0050795 | A1* | 3/2011 | Arai ..................... C09D 11/322 524/211 |
| 2011/0057986 | A1* | 3/2011 | Ikoshi .................... B41J 2/2107 347/100 |
| 2011/0074866 | A1* | 3/2011 | Imamura .............. C09D 11/322 106/31.13 |
| 2012/0026239 | A1 | 2/2012 | Yanagi |
| 2012/0040155 | A1 | 2/2012 | Komatsu et al. |
| 2012/0320124 | A1 | 12/2012 | Saito et al. |
| 2018/0056689 | A1 | 3/2018 | Makuta et al. |
| 2021/0130639 | A1* | 5/2021 | Sugihara ................... B41J 2/01 |
| 2021/0222023 | A1 | 7/2021 | Okuda et al. |
| 2022/0186060 | A1* | 6/2022 | Guo ..................... B41M 5/0023 |

FOREIGN PATENT DOCUMENTS

| | | |
|---|---|---|
| CN | 102371760 | 3/2012 |
| CN | 107533282 | 1/2018 |
| EP | 2412763 | 2/2012 |
| EP | 3291005 | 3/2018 |
| JP | 2002103783 | 4/2002 |
| JP | 2005119014 | 5/2005 |
| JP | 2011052135 | 3/2011 |
| JP | 2012025911 | 2/2012 |
| JP | 2013018951 | 1/2013 |
| JP | 2013023676 | 2/2013 |
| JP | 2014210837 | 11/2014 |
| JP | 2015071738 | 4/2015 |
| JP | 2018048282 | 3/2018 |
| WO | 2016178402 | 11/2016 |

OTHER PUBLICATIONS

Chen Rongqi, "Ink-jet Printing Inks Containing Organic Pigments", Dyestuff Industry, Feb. 2002, submit with English abstract, pp. 1-7.
Prabhat K. Das Gupta et al., "Interaction of urea with weak acids and water," Journal of Physical Chemistry, vol. 91, Oct. 1987, pp. 5826-5832.
"Search Report of Europe Counterpart Application", issued on Apr. 7, 2022, p. 1-p. 8.
"Office Action of Japan Counterpart Application", issued on Dec. 13, 2022, with English translation thereof, pp. 1-8.
"International Search Report (Form PCT/ISA/210) of PCT/JP2020/004504," mailed on Apr. 14, 2020, with English translation thereof, pp. 1-6.
"Written Opinion of the International Searching Authority (Form PCT/ISA/237)" of PCT/JP2020/004504, mailed on Apr. 14, 2020, with English translation thereof, pp. 1-8.
"Office Action of Japan Counterpart Application" with English translation thereof, issued on Jun. 14, 2022, p. 1-p. 10.

* cited by examiner

INK SET, IMAGE RECORDING METHOD, AND IMAGE RECORDED MATERIAL

CROSS-REFERENCE TO RELATED APPLICATIONS

This application is a Continuation of PCT International Application No. PCT/JP2020/004504 filed on Feb. 6, 2020, which claims priority under 35 U.S.C § 119(a) to Japanese Patent Application No. 2019-064596 filed on Mar. 28, 2019. Each of the above application(s) is hereby expressly incorporated by reference, in its entirety, into the present application.

BACKGROUND OF THE INVENTION

1. Field of the Invention

The present disclosure relates to an ink set, an image recording method, and an image recorded material.

2. Description of the Related Art

In the related art, white inks containing white pigments have been known.

For example, JP2014-210837A discloses, as an inkjet aqueous white ink containing titanium oxide as a pigment and having low viscosity, excellent preservation stability, and an excellent pigment sedimentation property, an inkjet aqueous white ink containing at least titanium oxide, a pigment dispersion resin, an organic solvent, and water, for which a resin obtained by copolymerizing at least α-olefin and maleic acid and/or maleic acid anhydride is used as a pigment dispersion resin.

Further, JP2013-23676A discloses, as an inkjet white ink capable of performing recording with sufficient whiteness and having more excellent dispersion stability as compared to those of the related art, an inkjet white ink containing hollow particles substantially formed of only a white metal oxide as a colorant. JP2013-23676A also discloses that at least one selected from the group consisting of titanium oxide, zinc oxide, and antimony oxide is preferable as the white metal oxide.

Further, JP2015-71738A discloses, as an ink set which is capable of preventing bleeding between inks and in which clogging is unlikely to occur in a case where a plurality of inks are superposed and recorded on a non-absorbent medium to be recorded and a low-absorbent medium to be recorded, an ink set which comprises a reaction solution containing an aggregating agent, a first ink containing a coloring material, and a second ink containing a coloring material, is used for performing recording on a non-absorbent medium to be recorded or a low-absorbent medium to be recorded, and is used by applying the reaction solution, the first ink, and the second ink onto the medium to be recorded such that the reaction solution, the first ink, and the second ink are superposed in order. JP2015-71738A discloses an aspect in which at least one of the first ink or the second ink is a color ink containing a color coloring material or a black ink containing a black coloring material, and the ink other than the first ink and the second ink is a white ink containing a white pigment.

SUMMARY OF THE INVENTION

An image to be recorded with an ink containing a white pigment is required to have a low light transmittance (also referred to as a "covering property") in some cases.

For example, it is considered that in a case where an image is recorded on a surface of a colored base material, visual recognition of the color of the base material through the image is prevented due to a high covering property of the image.

Further, it is considered that in a case where an image is recorded on a surface of a transparent base material, degradation of the visibility of the image caused by transmission of light through the transparent base material and the image is prevented due to the high covering property of the image.

Further, it is also known that the above-described image recorded using an inkjet ink containing white inorganic pigment particles is used as a base to be recorded under another colored image.

The visibility of a colored image is considered to be improved since it is possible to prevent the color of the base material from being visible or to prevent light from being transmitted through the base material and the image by using an image with a high covering property as the base, as described above.

Based on the examination conducted by the present inventors, it was found that in a case where an image is recorded by applying a treatment liquid onto a base material and applying an ink onto the surface of the base material onto which the treatment liquid has been applied, an image with an excellent covering property can be recorded by using a treatment liquid having a pH of 4.5 or less or 9.5 or greater as the treatment liquid and an ink containing a compound A which generates gas in an environment of a pH of 4.5 or less or 9.5 or greater, a resin, water, and a white pigment and having a pH of greater than 4.5 and less than 9.5 as the ink.

However, based on further examination conducted by the present inventors, it was also found that the adhesiveness of the image to the base material may be decreased in the image recorded in the above-described manner.

An object of the present disclosure is to provide an ink set capable of recording an image having an excellent covering property and excellent adhesiveness to a base material, an image recording method using the ink set, and an image recorded material comprising an impermeable base material and an image with an excellent covering property and excellent adhesiveness to the impermeable base material.

Specific means for achieving the above-described objects includes the following aspects.

<1> An ink set comprising: a treatment liquid having a pH of 4.5 or less or 9.5 or greater; and an ink containing a compound A which generates gas in an environment of a pH of 4.5 or less or 9.5 or greater, a resin, water, and a white pigment and having a pH of greater than 4.5 and less than 9.5, in which a ratio of a content mass of the white pigment to a content mass of the compound A in the ink is 1 or greater and 160 or less.

<2> The ink set according to <1>, in which an absolute value of a difference between the pH of the treatment liquid and the pH of the ink is 3 or greater.

<3> The ink set according to <1> or <2>, in which a ratio of a content mass of the resin to the content mass of the compound A in the ink is 0.3 or greater and 100 or less.

<4> The ink set according to any one of <1> to <3>, in which a ratio of a total content mass of the white pigment and the resin to the content mass of the compound A in the ink is 3 or greater and 250 or less.

<5> The ink set according to any one of <1> to <4>, in which the compound A is urea.

<6> The ink set according to any one of <1> to <5>, in which a content of the white pigment in the ink is in a range of 5% by mass to 20% by mass with respect to a total amount of the ink.

<7> The ink set according to any one of <1> to <6>, in which the white pigment contains titanium dioxide particles.

<8> The ink set according to any one of <1> to <7>, in which the ink is a white ink.

<9> The ink set according to any one of <1> to <8>, in which a content of the resin is in a range of 1% by mass to 10% by mass with respect to a total amount of the ink, and a content of the compound A is in a range of 0.1% by mass to 10% by mass with respect to the total amount of the ink.

<10> The ink set according to any one of <1> to <9>, in which the resin contains resin particles.

<11> The ink set according to <10>, in which a glass transition temperature of the resin particles is 40° C. or higher.

<12> The ink set according to any one of <1> to <11>, in which the ink is an inkjet ink.

<13> The ink set according to any one of <1> to <12>, in which the treatment liquid contains at least one aggregating agent selected from the group consisting of an organic acid, a polyvalent metal compound, a metal complex, and a water-soluble cationic polymer.

<14> The ink set according to any one of <1> to <13>, in which the ink set is used for recording an image on an impermeable base material.

<15> An image recording method using the ink set according to any one of <1> to <14>, the method comprising: a step of applying the treatment liquid on an impermeable base material; and a step of recording an image by applying the ink onto a surface of the impermeable base material onto which the treatment liquid has been applied.

<16> The image recording method according to <15>, in which in a case where an amount of the treatment liquid to be applied per unit area in the step of applying the treatment liquid is defined as X g/m$^2$ and an amount of the ink to be applied per unit area in the step of recording the image is defined as Y g/m$^2$, a ratio of Y/X is 3 or greater and 25 or less.

<17> An image recorded material comprising: an impermeable base material; and an image disposed on the impermeable base material and containing a resin and a white pigment, in which a void volume in the image is 1% or greater and 30% or less.

According to an aspect of the present disclosure, it is possible to provide an ink set capable of recording an image having an excellent covering property and excellent adhesiveness to a base material, an image recording method using the ink set, and an image recorded material comprising an impermeable base material and an image with an excellent covering property and excellent adhesiveness to the impermeable base material.

DESCRIPTION OF THE PREFERRED EMBODIMENTS

Figure 1:
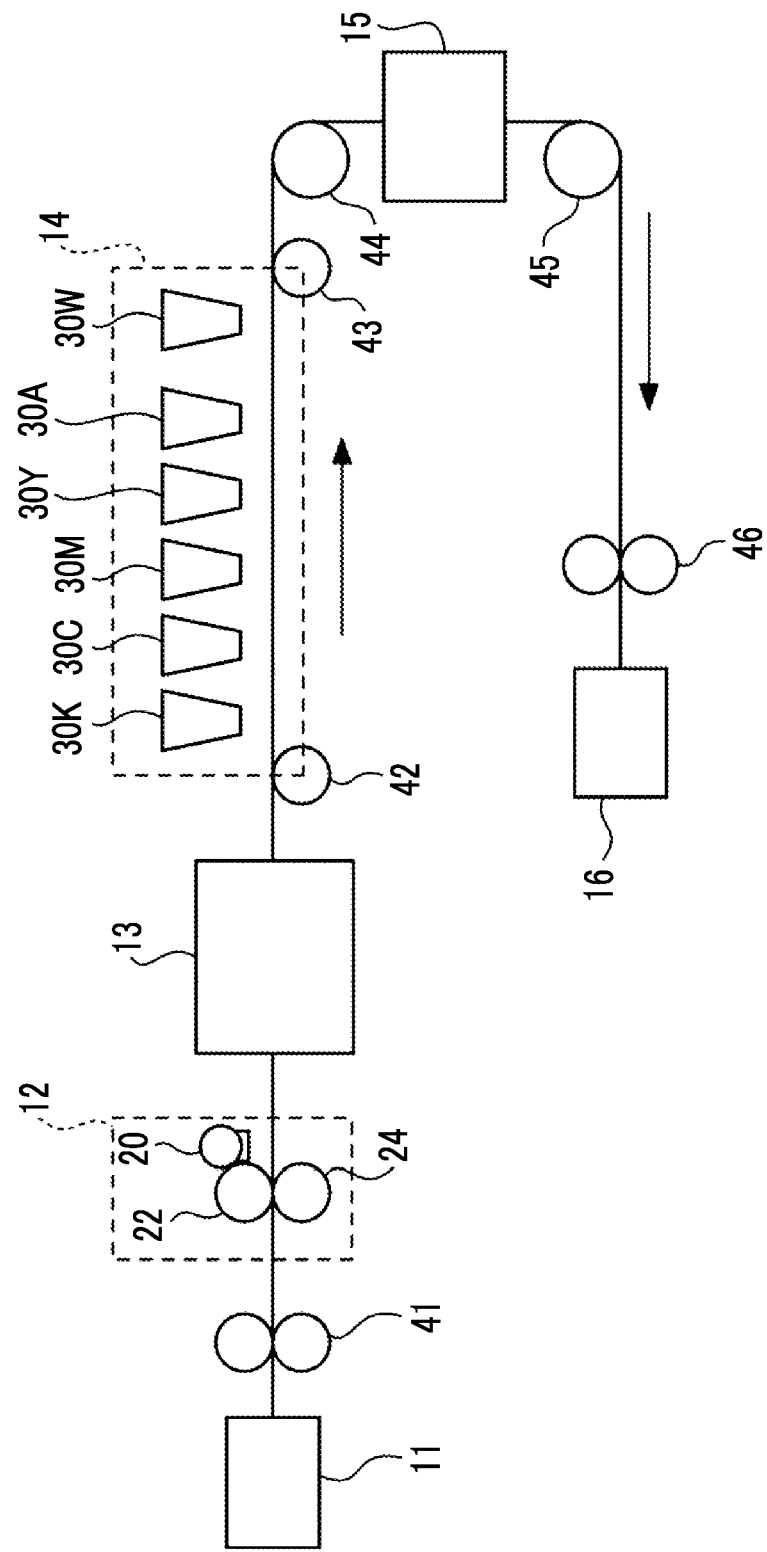
FIG. 1 is a schematic configuration view illustrating a configuration example of an ink jet recording device used for performing image recording.

In the present disclosure, the numerical ranges shown using "to" indicate ranges including the numerical values described before and after "to" as the lower limits and the upper limits.

In a numerical range described in a stepwise manner in the present disclosure, an upper limit or a lower limit described in a certain numerical range may be replaced with an upper limit or a lower limit in another numerical range described in a stepwise manner.

Further, in a numerical range described in the present disclosure, an upper limit or a lower limit described in a certain numerical range may be replaced with a value described in an example.

In the present disclosure, in a case where a plurality of substances corresponding to respective components in a composition are present, the amount of the respective components in the composition indicates the total amount of the plurality of substances present in the composition unless otherwise specified.

In the present disclosure, "recording an image" indicates that an image is drawn on a base material using an ink and a treatment liquid as necessary and the drawn image is fixed. The "image" may be an image recorded with ink and includes characters, solid films, and the like.

In the present disclosure, the meaning of the term "step" includes not only an independent step but also a step whose intended purpose is achieved even in a case where the step is not clearly distinguished from other steps.

In the present disclosure, "(meth)acryl" indicates at least one of acryl or methacryl, and "(meth)acrylate" indicates at least one of acrylate or methacrylate.

[Ink Set]

An ink set of the present disclosure is an ink set comprising a treatment liquid having a pH of 4.5 or less or 9.5 or greater; and an ink containing a compound A which generates gas in an environment of a pH of 4.5 or less or 9.5 or greater, a resin, water, and a white pigment and having a pH of greater than 4.5 and less than 9.5, in which the ratio of the content mass of the white pigment to the content mass of the compound A in the ink (hereinafter, also referred to as the "content mass ratio [white pigment/compound A]" or simply referred to as "white pigment/compound A") is 1 or greater and 160 or less.

According to the ink set of the present disclosure, an image with an excellent covering property and excellent adhesiveness to an impermeable base material can be recorded.

The reason why such an effect is exhibited is assumed as follows.

Based on the examination conducted by the present inventors, it was found that in a case where an image is recorded by applying a treatment liquid onto an impermeable base material and applying an ink onto the surface of the impermeable base material onto which the treatment liquid has been applied, an image with an excellent covering property can be recorded by using a treatment liquid having a pH of 4.5 or less or 9.5 or greater as the treatment liquid and an ink containing a compound A which generates gas in an environment of a pH of 4.5 or less or 9.5 or greater, a resin, water, and a white pigment and having a pH of greater than 4.5 and less than 9.5 as the ink. The reason for this is assumed as follows.

It is considered that gas is generated due to the contact between the treatment liquid and the compound A in the process of recording an image, and as a result, appropriate voids are formed in the image to be recorded. It is considered that the covering property of the image is improved due to the combination of the voids in the image to be recorded and the whiteness of the white pigment contained in the image. The effect of improving the covering property is exhibited in a case where the content mass ratio [white pigment/compound A] is 160 or less.

Based on further examination conducted by the present inventors, it was also found that the adhesiveness of the image to the impermeable base material (hereinafter, also simply referred to as the "adhesiveness") may be decreased in the image recorded in the above-described manner.

It is considered that the decrease in the adhesiveness occurs in a case where the number of voids in the image is extremely increased.

In the ink set of the present disclosure, the decrease in the adhesiveness of the image is suppressed in a case where the content mass ratio [white pigment/compound A] in the ink is 1 or greater. The reason for this is considered to be that an extreme increase in the number of voids in the image can be suppressed.

In the ink set of the present disclosure, the treatment liquid having a pH of 4.5 or less or 9.5 or greater (hereinafter, also referred to as the "specific treatment liquid") indicates a treatment liquid having a pH 4.5 or less or a pH 9.5 or greater.

The ink set of the present disclosure may comprise only one or two or more kinds of specific treatment liquids.

For example, the ink set of the present disclosure may comprise one or more treatment liquids having a pH of 4.5 or less and one or more treatment liquids having a pH of 9.5 or less.

The ink set of the present disclosure may comprise only one or two or more kinds of inks (hereinafter, also referred to as the "specific ink") containing a compound A that generates gas in an environment of a pH of 4.5 or less or 9.5 or greater, a resin, water, and a white pigment and having a pH of greater than 4.5 and less than 9.5.

The color of the specific ink is not particularly limited as long as the color is exhibited by an ink containing a white pigment.

Examples of the color of the specific ink include white, gray, and whitish chromatic colors (such as, light cyan, light magenta, light yellow, light blue, and pink).

Examples of the gray ink include specific inks containing a white pigment and a black coloring material.

Examples of the whitish chromatic ink include specific inks containing a white pigment and a chromatic coloring material (such as a cyan coloring material, a magenta coloring material, and a yellow coloring material).

From the viewpoint of more effectively exhibiting the effect of improving the covering property, it is preferable that the specific ink is white ink.

Here, the white ink indicates an ink having a brightness of 9 or greater, which is specified in JIS Z 8721: 1993.

Further, the ink set of the present disclosure may comprise a liquid other than the specific ink and the specific treatment liquid.

As the liquid other than the specific ink and the specific treatment liquid, an ink other than the specific ink is suitable.

As the ink other than the specific ink, an ink other than white ink (that is, chromatic ink and/or black ink) such as cyan ink, magenta ink, yellow ink, or black ink is suitable, and chromatic inkjet ink and/or black inkjet ink is more suitable.

The specific ink in the ink set of the present disclosure is not particularly limited, but an inkjet ink is preferable as the specific ink from the viewpoints of the efficiency of image recording and the like.

That is, in a case where the specific ink in the ink set of the present disclosure is an inkjet ink, the ink can be used in an ink jet recording device. In this manner, a composite image obtained by combining a fine image recorded using a chromatic inkjet ink and/or a black inkjet ink and an image with an excellent covering property and excellent adhesiveness using the ink set of the present disclosure can be efficiently recorded. The composite image can also be recorded using a single ink jet recording device, and the composite image can be recorded more efficiently in this case.

The viscosity of the inkjet ink is preferably 20 cP or less.

Further, the ink set of the present disclosure can be used for recording an image on any base material (that is, a recording medium) such as a paper base material or a resin base material.

Typically, since in a case of recording an image on an impermeable base material (for example, a resin base material), the ink is unlikely to permeate into the base material, there is a tendency that the adhesiveness of the image to the base material is not obtained as compared to a case of recording an image on a permeating base material.

However, according to the ink set of the present disclosure which is capable of recording an image with excellent adhesiveness to a base material, an image with excellent adhesiveness to an impermeable base material can be obtained even in a case where an impermeable base material is used as a base material.

Therefore, it is preferable that the ink set of the present disclosure is used for recording an image on an impermeable base material.

A preferred embodiment of the impermeable base material will be described below.

<Specific Ink>

The ink set of the present disclosure contains at least one specific ink (that is, an ink containing a compound A, a resin, water, and a white pigment that generates gas in an environment of a pH of 4.5 or less or 9.5 or greater and having a pH of greater than 4.5 and less than 9.5).

(Compound A that Generates Gas in Environment of pH of 4.5 or Less or 9.5 or Greater)

The specific ink contains at least one compound A that generates gas in an environment of a pH of 4.5 or less or 9.5 or greater.

Here, the expression "generates gas in an environment of a pH of 4.5 or less or 9.5 or greater" indicates that gas is generated in at least one of an environment of a pH of 4.5 or less or an environment of pH of 9.5 or greater.

The compound A is not particularly limited as long as the compound generates gas in an environment of a pH of 4.5 or less or 9.5 or greater, and examples thereof include a carbonate such as urea or calcium carbonate, a carboxylate such as sodium acetate, and an aluminum salt such as ammonium chloride. It is preferable that the compound A does not generate gas in an environment of a pH of greater than 4.5 and less than 9.5.

Urea is particularly preferable as the compound A.

The content of the compound A with respect to the total amount of the specific ink is not particularly limited as long as the content mass ratio [white pigment/compound A] is 1 or greater and 160 or less.

The content of the compound A is preferably in a range of 0.06% by mass to 10% by mass and more preferably in a range of 0.1% by mass to 10% by mass with respect to the total amount of the specific ink.

In a case where the content of the compound A is 0.06% by mass or more with respect to the total amount of the specific ink, the covering property of the image is further improved. From the viewpoint of further improving the covering property of the image, the content of the compound A is preferably 0.1% by mass or greater, more preferably 0.2% by mass or greater, and still more preferably 0.5% by mass or greater with respect to the total amount of the specific ink.

In a case where the content of the compound A is 10% by mass or less with respect to the total amount of the specific ink, the adhesiveness of the image is further improved. From the viewpoint of further improving the adhesiveness of the image, the content of the compound A is preferably 4% by mass or less and more preferably 2% by mass or less with respect to the total amount of the specific ink.

(Resin)

The specific ink contains at least one kind of resin.

Here, the resin indicates all resin components contained in the specific ink.

Specific examples of the form of the resin contained in the specific ink include resin particles which are particles formed of a resin and a resin dispersant for coating at least a part of a pigment to disperse the pigment.

It is preferable that the resin contained in the specific ink contains at least one kind of resin particles.

In a case where the resin contained in the specific ink contains resin particles, the adhesiveness of the image is further improved. Further, the jetting stability in a case where the specific ink is used as the inkjet ink is also improved.

Resin Particles

It is preferable that the resin particles have a solid shape.

In the present disclosure, the solid shape is a term used as an antonym of a hollow shape.

Specifically, the void volume of the resin particles is preferably less than 10% and more preferably 5% or less.

Further, in a case where the resin particles have voids, the void volume thereof can be acquired by the following equation. In a case where the resin particles do not have voids, the void volume thereof is 0%.

Void volume (%)=(radius of void of resin particle/radius of resin particle)$^3$×100

Further, in a case where the resin particles have a plurality of voids instead of one void, the void volume thereof is acquired by the equation of "void volume (%)=Σ(radius of void of resin particle)$^3$/(radius of resin particle (½ of particle diameter))$^3$×100".

The radius of the resin particle and the radius of the void of the resin particle are acquired by observing the resin particles with a transmission electron microscope. The arithmetic average value of the void volumes of 100 resin particles is defined as the void volume of the resin particles.

The glass transition temperature (Tg) of the resin particles is not particularly limited.

From the viewpoint of further improving the adhesiveness of the image, the glass transition temperature (Tg) of the resin particles is preferably 0° C. or higher, more preferably 40° C. or higher, still more preferably 80° C. or higher, even still more preferably 120° C. or higher, and even still more preferably 140° C. or higher.

The upper limit of the Tg of the resin particles is not particularly limited, but the Tg of the resin particles is preferably 300° C. or lower, more preferably 200° C. or lower, and still more preferably 180° C. or lower.

In the present disclosure, a measured Tg obtained by actual measurement is used as the glass transition temperature (Tg).

Specifically, the measured Tg indicates a value measured under typical measurement conditions using a differential scanning calorimeter (DSC) EXSTAR6220 (manufactured by Hitachi High-Tech Science Corporation). In a case where it is difficult to perform measurement due to decomposition or the like of the resin, a calculated Tg to be calculated by the following calculation formula is used. The calculated Tg indicates a value calculated by Formula (1).

$$1/Tg = \Sigma(Xi/Tgi) \tag{1}$$

Here, it is assumed that the resin as a target for calculation is formed by copolymerizing n kinds of monomer components (i represents 1 to n). Xi represents a weight fraction (ΣXi=1) of the i-th monomer and Tgi represents a glass transition temperature (absolute temperature) of a homopolymer of the i-th monomer. Here, Σ is obtained by summing 1 to n as i. Further, values in Polymer Handbook (3rd Edition) (written by J. Brandrup, E. H. Immergut (Wiley-Interscience, 1989)) are employed as the value (Tgi) of the glass transition temperature of the homopolymer of each monomer. The values of the glass transition temperatures of homopolymers of monomers, which are not described in the document, are obtained as the measured Tg by the above-described measuring method after the homopolymers of the monomers are prepared. Here, in a case where the weight-average molecular weight of the homopolymer is set to 10000 or greater, the influence of the weight-average molecular weight on the Tg of the polymer can be ignored.

The glass transition temperature of the resin particles can be appropriately controlled by a commonly used method. For example, the glass transition temperature of the resin particles can be controlled to be in a desired range by appropriately selecting the kind of monomer (polymerizable compound) constituting the resin particles, the compositional ratio thereof, the molecular weight of the resin constituting the resin particles, and the like.

Examples of the resin in the resin particles include an acrylic resin, an epoxy resin, a polyether resin, a polyamide resin, an unsaturated polyester resin, a phenol resin, a silicone resin, a fluororesin, a polyvinyl resin (such as vinyl chloride, vinyl acetate, polyvinyl alcohol, or polyvinyl butyral), an alkyd resin, a polyester resin (such as a phthalic acid resin), and an amino material (such as a melamine resin, a melamine formaldehyde resin, an aminoalkyd co-condensation resin, or a urea resin).

As the resin particles, particles of an acrylic resin, a polyether resin, a polyester resin, and a polyolefin resin are preferable, and particles of an acrylic resin are more preferable.

Further, in the present disclosure, the acrylic resin indicates a resin having a constitutional unit derived from (meth)acrylic acid or a (meth)acrylate compound. The acrylic resin may have a constitutional unit other than the constitutional unit derived from (meth)acrylic acid or a (meth)acrylate compound.

Further, the resin forming the resin particles may be a copolymer having two or more kinds of constitutional units constituting the resins exemplified above or a mixture of two or more kinds of the resins. Further, the resin particles may be formed of a mixture of two or more kinds of the resins and may be composite resin particles obtained by laminating two or more kinds of the resins, for example, a core and a shell.

As the resin particles, resin particles obtained by a phase-transfer emulsification method are preferable, and particles of a self-dispersing resin (self-dispersing resin particles) are more preferable.

Here, the self-dispersing resin indicates a water-insoluble resin which may enter a dispersed state in an aqueous medium by a functional group (particularly, an acidic group of a carboxy group or the like or a salt thereof) contained in the resin itself in a case where the resin has entered the dispersed state according to the phase-transfer emulsification method in the absence of a surfactant.

Here, the concept of the dispersed state includes both an emulsified state (emulsion) in which a water-insoluble resin is dispersed in the aqueous medium in a liquid state and a dispersed state (suspension) in which a water-insoluble resin is dispersed in the aqueous medium in a solid state.

In addition, the term "water-insoluble" indicates that the amount of substance to be dissolved in 100 parts by mass (25° C.) of water is less than 5.0 parts by mass (preferably less than 1.0 parts by mass).

As the phase-transfer emulsification method, a method of dissolving or dispersing a resin in a solvent (for example, a water-soluble solvent), putting the solution into water without adding a surfactant thereto, stirring and mixing the solution, and removing the solvent in a state in which a salt-forming group (for example, an acidic group such as a carboxy group) contained in the resin is neutralized, to obtain an aqueous dispersion in an emulsified or dispersed state is exemplified.

The self-dispersing resin particles can be selected from among self-dispersing resin particles described in paragraphs 0090 to 0121 of JP2010-64480A and paragraphs 0130 to 0167 of JP2011-068085A and then used.

Self-dispersing resin particles containing a carboxy group are preferable as the self-dispersing resin particles.

As a form of the self-dispersing resin particles containing a carboxy group, a form in which particles are formed of a resin having a constitutional unit derived from an unsaturated carboxylic acid (preferably (meth)acrylic acid) is more preferable.

A still more preferable form of the self-dispersing resin particles containing a carboxy group is a form in which particles are formed of a resin having a constitutional unit containing an alicyclic group, a constitutional unit containing an alkyl group, and a constitutional unit derived from an unsaturated carboxylic acid (preferably (meth)acrylic acid).

The content of the constitutional unit containing an alicyclic group in the above-described resin (the total content in a case where two or more kinds of constitutional units are present) is preferably in a range of 3% by mass to 95% by mass, more preferably in a range of 5% by mass to 75% by mass, and still more preferably in a range of 10% by mass to 50% by mass with respect to the total amount of the resin.

The content of the constitutional unit containing an alkyl group in the above-described resin (the total content in a case where two or more kinds of constitutional units are present) is preferably in a range of 5% by mass to 90% by mass, more preferably in a range of 10% by mass to 85% by mass, still more preferably in a range of 20% by mass to 80% by mass, even still more preferably in a range of 30% by mass to 75% by mass, and even still more preferably in a range of 40% by mass to 75% by mass with respect to the total amount of the resin.

The content of the constitutional unit derived from an unsaturated carboxylic acid (preferably (meth)acrylic acid) in the above-described resin (the total content in a case where two or more kinds of constitutional units are present) is preferably in a range of 2% by mass to 30% by mass, more preferably in a range of 5% by mass to 20% by mass, and still more preferably in a range of 5% by mass to 15% by mass with respect to the total amount of the resin.

Further, a form in which the constitutional unit containing an alicyclic group is changed into a constitutional unit containing an aromatic group or a form which has a constitutional unit containing an aromatic group in addition to the constitutional unit containing an alicyclic group, in the "still more preferable form of the self-dispersing resin particles containing a carboxy group" described above, is also preferable as the form of self-dispersing resin particles containing a carboxy group.

In both forms, the total content of the constitutional unit containing an alicyclic group and the constitutional unit containing an aromatic group is preferably in a range of 3% by mass to 95% by mass, more preferably in a range of 5% by mass to 75% by mass, and still more preferably in a range of 10% by mass to 50% by mass with respect to the total amount of the resin.

It is preferable that the constitutional unit containing an alicyclic group is a constitutional unit derived from alicyclic (meth)acrylate.

Examples of the alicyclic (meth)acrylate include monocyclic (meth)acrylate, bicyclic (meth)acrylate, and tricyclic (meth)acrylate.

Examples of the monocyclic (meth)acrylate include cycloalkyl (meth)acrylate in which the number of carbon atoms in a cycloalkyl group is in a range of 3 to 10, such as cyclopropyl (meth)acrylate, cyclobutyl (meth)acrylate, cyclopentyl (meth)acrylate, cyclohexyl (meth)acrylate, cycloheptyl (meth)acrylate, cyclooctyl (meth)acrylate, cyclononyl (meth)acrylate, or cyclodecyl (meth)acrylate.

Examples of the bicyclic (meth)acrylate include isobornyl (meth)acrylate and norbornyl (meth)acrylate.

Examples of the tricyclic (meth)acrylate include adamantyl (meth)acrylate, dicyclopentanyl (meth)acrylate, and dicyclopentenyloxyethyl (meth)acrylate.

These may be used alone or in the form of a mixture of two or more kinds thereof.

Among these, from the viewpoints of the fixing property, the blocking resistance, and the dispersion stability of the self-dispersing resin particles, bicyclic (meth)acrylate or tri- or higher cyclic polycyclic (meth)acrylate is preferable; and isobornyl (meth)acrylate, adamantyl (meth)acrylate, or dicyclopentanyl (meth)acrylate is more preferable.

As the constitutional unit containing an aromatic group, a constitutional unit derived from an aromatic group-containing monomer is preferable.

Examples of the aromatic group-containing monomer include an aromatic group-containing (meth)acrylate monomer (such as phenoxyethyl (meth)acrylate, benzyl (meth)acrylate, or phenyl (meth)acrylate) and a styrene compound.

Among these, from the viewpoints of the balance between the hydrophilicity and the hydrophobicity of the resin chain and the ink fixing property, an aromatic group-containing (meth)acrylate monomer is preferable; phenoxyethyl (meth)acrylate, benzyl (meth)acrylate, or phenyl (meth)acrylate is more preferable; and phenoxyethyl (meth)acrylate or benzyl (meth)acrylate is still more preferable.

As the constitutional unit containing an alkyl group, a constitutional unit derived from an alkyl group-containing monomer is preferable.

Examples of the alkyl group-containing monomer include alkyl (meth)acrylate such as methyl (meth)acrylate, ethyl (meth)acrylate, isopropyl (meth)acrylate, n-propyl (meth) acrylate, n-butyl (meth)acrylate, isobutyl (meth)acrylate, t-butyl (meth)acrylate, hexyl (meth)acrylate, or ethylhexyl (meth)acrylate; an ethylenically unsaturated monomer containing a hydroxyl group such as hydroxymethyl (meth) acrylate, 2-hydroxyethyl (meth)acrylate, 2-hydroxypropyl (meth)acrylate, 4-hydroxybutyl (meth)acrylate, hydroxypentyl (meth)acrylate, or hydroxyhexyl (meth)acrylate; dialkylaminoalkyl (meth)acrylate such as dimethylaminoethyl (meth)acrylate; and (meth)acrylamide, for example, N-hydroxyalkyl (meth)acrylamide such as N-hydroxymethyl (meth)acrylamide, N-hydroxyethyl (meth)acrylamide, or N-hydroxybutyl (meth)acrylamide, and N-alkoxyalkyl (meth)acrylamide such as N-methoxymethyl (meth)acrylamide, N-ethoxymethyl (meth)acrylamide, N-(n-,iso)butoxymethyl (meth)acrylamide, N-methoxyethyl (meth)acrylamide, N-ethoxyethyl (meth)acrylamide, or N-(n-, iso) butoxyethyl (meth)acrylamide.

Among these, alkyl (meth)acrylate is preferable; alkyl (meth)acrylate in which the number of carbon atoms in an alkyl group is in a range of 1 to 4 is more preferable; methyl (meth)acrylate, ethyl (meth)acrylate, isopropyl (meth)acrylate, or butyl (meth)acrylate is still more preferable; and methyl (meth)acrylate is even still more preferable.

The weight-average molecular weight of the resin constituting the resin particles (preferably the self-dispersing resin particles, the same applies hereinafter) is preferably in a range of 3000 to 200000, more preferably in a range of 5000 to 150000, and still more preferably in a range of 10000 to 100000.

In a case where the weight-average molecular weight thereof is 3000 or greater, the amount of water-soluble components can be effectively suppressed. Further, the self-dispersion stability can be improved by setting the weight-average molecular weight thereof to 200000 or less.

The weight-average molecular weight of the resin constituting the resin particles indicates a value measured by gel permeation chromatography (GPC).

The measurement according to gel permeation chromatography (GPC) is performed using HLC (registered trademark)-8020GPC (manufactured by Tosoh Corporation) as a measuring device, three columns of TSKgel (registered trademark) Super Multipore HZ-H (manufactured by Tosoh Corporation, 4.6 mmID×15 cm), and tetrahydrofuran (THF) as an eluent. Further, the measurement is performed under measurement conditions of a sample concentration of 0.45% by mass, a flow rate of 0.35 ml/min, a sample injection volume of 10 and a measurement temperature of 40° C. using a differential refractive index (RI) detector.

Further, the calibration curve is prepared using eight samples of "F-40", "F-20", "F-4", "F-1", "A-5000", "A-2500", "A-1000", and "n-propylbenzene" which are "Standard Samples TSK standard, polystyrene" (manufactured by Tosoh Corporation).

From the viewpoints of the self-dispersibility and the aggregation rate in a case where the treatment liquid is in contact with the resin, the acid value of the resin constituting the resin particles is preferably 100 mgKOH/g or less and more preferably in a range of 25 mgKOH/g to 100 mgKOH/g.

The volume average particle diameter of the resin particles is preferably in a range of 1 nm to 200 nm, more preferably in a range of 1 nm to 150 nm, still more preferably in a range of 1 nm to 100 nm, and particularly preferably in a range of 1 nm to 10 nm. In a case where the volume average particle diameter thereof is 1 nm or greater, the manufacturing suitability is improved. Further, in a case where the volume average particle diameter is 200 nm or less, the preservation stability is improved. Further, the particle size distribution of resin particles A is not particularly limited, and any of resin particles having a wide particle size distribution or resin particles having a monodispersed particle size distribution may be used.

The volume average particle diameter of the resin particles is measured by a particle size distribution measuring device (for example, MICROTRAC UPA (registered trademark) EX150, manufactured by NIKKISO CO., LTD.) using light scattering.

From the viewpoint of improving the covering property, the refractive index of the resin particles is preferably in a range of 1.0 to 1.7.

The resin particles may be used alone or in combination of two or more kinds thereof.

The content of the resin particles (preferably self-dispersing resin particles) in the ink (the total content in a case where two or more kinds of particles are present) is not particularly limited, but is preferably in a range of 0.5% by mass to 11% by mass, more preferably in a range of 0.5% by mass to 9% by mass, still more preferably in a range of 2% by mass to 9% by mass, and even still more preferably in a range of 2% by mass to 7% by mass with respect to the total amount of the ink.

In a case where the content thereof is 0.5% by mass or greater, the adhesiveness of the image is further improved.

In a case where the content thereof is 11% by mass or less, the dispersion stability of the ink can be further improved. Therefore, for example, in a case where the ink is used as the inkjet ink, the jetting stability of the ink from an ink jet head (hereinafter, also simply referred to as the "jetting stability") can be further improved.

Hereinafter, specific examples of the resin particles will be described, but the present disclosure is not limited thereto. Further, the values in the parentheses indicate the mass ratios of the copolymer components.

Copolymer of methyl methacrylate/isobornyl methacrylate/methacrylic acid/sodium methacrylate (70/20/5/5), Tg: 150° C.

Joncryl (registered trademark) JDX-C3080 (manufactured by Johnson Polymers, Ltd.), Tg: 130° C.

TREPEARL (registered trademark) EP, manufactured by Toray Industries, Inc., Tg: 190° C.

TREPEARL (registered trademark) PES, manufactured by Toray Industries, Inc., Tg: 225° C.

Resin Dispersant

The specific ink may contain, as a resin, a resin dispersant for coating at least a part of the pigment to disperse the pigment.

Here, the pigment indicates a pigment contained in the specific ink which is represented by a white pigment described below.

An acrylic resin is preferable as the resin dispersant.

Preferred examples of the resin dispersant include dispersants described in paragraphs 0080 to 0096 of JP2016-145312A.

The content of the dispersant is preferably in a range of 3% by mass to 20% by mass, more preferably in a range of 4% by mass to 18% by mass, and still more preferably in a range of 5% by mass to 15% by mass with respect to the content of the entire pigment contained in the specific ink.

Further, the content (z % by mass described below) of the dispersant is preferably in a range of 0.1% by mass to 2.4% by mass, more preferably in a range of 0.5% by mass to 2.0% by mass, and still more preferably in a range of 0.8% by mass to 1.5% by mass with respect to the total amount of the specific ink.

Preferable Content Of Resin

The content of the resin (for example, the resin particles and the resin dispersant) in the specific ink (for example, the total content of the resin particles and the resin dispersant) is preferably in a range of 1% by mass to 12% by mass, more preferably in a range of 1% by mass to 10% by mass, still more preferably in a range of 3% by mass to 10% by mass, and even still more preferably in a range of 3% by mass to 8% by mass with respect to the total amount of the specific ink.

Further, the ratio of the content mass of the resin (for example, the resin particles and the resin dispersant) to the content mass of the compound A in the specific ink (hereinafter, also referred to as the "content mass ratio [resin/compound A]" or "entire resin/compound A") is preferably 0.1 or greater and 120 or less, more preferably 0.2 or greater and 100 or less, and still more preferably 0.3 or greater and 100 or less.

In a case where the content mass ratio [resin/compound A] is 0.1 or greater, the adhesiveness of the image is further improved. From the viewpoint of further improving the adhesiveness of the image, the content mass ratio [resin/compound A] is more preferably 0.2 or greater, still more preferably 0.3 or greater, even still more preferably 0.5 or greater, even still more preferably 1 or greater, even still more preferably 2 or greater, and even still more preferably 3 or greater.

In a case where the content mass ratio [resin/compound A] is 120 or less, the covering property of the image is further improved. From the viewpoint of further improving the covering property of the image, the content mass ratio [resin/compound A] is more preferably 100 or less, still more preferably 50 or less, and even still more preferably 20 or less.

White Pigment

The specific ink contains at least one white pigment.

Known white pigments are used as the white pigment without particular limitation, and examples thereof include inorganic pigment particles such as titanium dioxide particles ($TiO_2$), zinc oxide particles, barium sulfate particles, silicon oxide particles, aluminum oxide particles, magnesium oxide particles, calcium silicate particles, calcium carbonate particles, kaolin particles, talc particles, and colloidal silica particles. Further, hollow resin particles are also exemplified as the white pigment.

From the viewpoint of the covering property of the image, it is particularly preferable that the white pigment contains titanium dioxide particles.

Since the titanium dioxide particles are particles having a large refractive index, the covering property of the image is further improved in a case where the white pigment contains the titanium dioxide particles.

Examples of the titanium dioxide particles include anatase type titanium dioxide particles, rutile type titanium dioxide particles, and brookite type titanium dioxide particles. Among these, from the viewpoint of the refractive index, rutile type titanium dioxide particles are preferable. Further, the rutile type titanium dioxide particles also have an advantage that the influence on the resin in the specific ink, the resin base material, and the like is small because of a weaker photocatalytic action than that of the anatase type titanium dioxide particles or the brookite type titanium dioxide particles.

In a case where the white pigment contains titanium dioxide particles, the white pigment may contain a white pigment (for example, inorganic pigment particles) other than the titanium dioxide particles.

In a case where the white pigment contains titanium dioxide particles, the proportion of the titanium dioxide particles in the total amount of the white pigment is preferably 20% by mass or greater, more preferably 50% by mass or greater, and still more preferably 80% by mass or greater. The upper limit of the proportion of titanium dioxide particles in the total amount of the white pigment is not particularly limited and may be 100% by mass or less.

From the viewpoint of further improving the covering property of the image, the average primary particle diameter of the white pigment is preferably 100 nm or greater, more preferably 150 nm or greater, and still more preferably 200 nm or greater.

Further, from the viewpoint of dispersion stability of the ink (for example, the jetting stability in a case where the ink is used as the inkjet ink), the average primary particle diameter of the white pigment is preferably 400 nm or less and more preferably 300 nm or less.

The average primary particle diameter of the white pigment in the present disclosure is a value measured using a transmission electron microscope (TEM). A transmission electron microscope 1200EX (manufactured by JEOL Ltd.) can be used for the measurement.

Specifically, the average particle diameter thereof is acquired by adding an ink diluted to 1000 times dropwise to Cu200 mesh (manufactured by JEOL Ltd.) to which a carbon film has been attached, drying the ink, measuring the equivalent circle diameters of 300 independent particles that do not overlap each other in the image enlarged at a magnification of 100000 times using a TEM, and averaging the measured values.

Further, from the viewpoint of the covering property of the image, the refractive index of the white pigment is preferably 2.0 or greater.

In the present disclosure, the "refractive index" indicates a value measured by ellipsometry using visible light having a wavelength of 550 nm at a temperature of 23° C., unless otherwise specified.

The content of the white pigment in the specific ink is preferably in a range of 1% by mass to 20% by mass, more preferably in a range of 3% by mass to 20% by mass, still more preferably in a range of 5% by mass to 20% by mass, even still more preferably in a range of 6% by mass to 20% by mass, and even still more preferably in a range of 7% by mass to 15% by mass with respect to the total amount of the specific ink.

In a case where the content of the white pigment in the specific ink is 1% by mass or greater with respect to the total amount of the specific ink, the covering property of the image is further improved.

In a case where the content of the white pigment in the specific ink is 20% by mass or less with respect to the total amount of the specific ink, the adhesiveness of the image is further improved.

As described above, the content mass ratio [white pigment/compound A] (that is, the ratio of the content mass of the white pigment to the content mass of the compound A) in the specific ink is 1 or greater and 160 or less.

From the viewpoint of further improving the adhesiveness of the image, the content mass ratio [white pigment/compound A] is preferably 2 or greater and more preferably 3 or greater.

From the viewpoint of further improving the covering property of the image, the content mass ratio [white pigment/compound A] is more preferably 100 or less, still more preferably 50 or less, and even still more preferably 20 or less.

The ratio of the total content mass of the white pigment and the resin to the content mass of the compound A in the specific ink (hereinafter, also referred to as the "content mass ratio [(white pigment and resin)/compound A]" or "(white pigment +entire resin)/compound A") is preferably 3 or greater and 250 or less.

In a case where the content mass ratio [(white pigment and resin)/compound A] is 3 or greater, the adhesiveness of the image is further improved. From the viewpoint of further improving the adhesiveness of the image, the content mass ratio [(white pigment and resin)/compound A] is more preferably 6 or greater and still more preferably 7 or greater.

In a case where the content mass ratio [(white pigment and resin)/compound A] is 250 or less, the covering property of the image is further improved. From the viewpoint of further improving the covering property of the image, the content mass ratio [(white pigment and resin)/compound A] is more preferably 240 or less, still more preferably 100 or less, even still more preferably 50 or less, and even still more preferably 30 or less.

(Other Coloring Materials)

The specific ink may further contain coloring materials other than the white pigment.

Examples of other coloring materials include organic pigment particles and inorganic pigment particles, and preferred examples thereof include pigment particles described in paragraphs 0029 to 0041 of JP2011-94112A.

The proportion of the white pigment in the entire coloring material contained in the specific ink is preferably 50% by mass or greater, more preferably 80% by mass or greater, and still more preferably 90% by mass or greater.

The proportion of the white pigment in the entire coloring material contained in the specific ink may be 100% by mass.

(Water)

The specific ink contains water.

The content of water is preferably 30% by mass or greater, more preferably 40% by mass or greater, and still more preferably 50% by mass or greater with respect to the total amount of the specific ink.

The upper limit of the content of water depends on the amount of other components. The upper limit of the content of water with respect to the total amount of the specific ink may be 90% by mass, 80% by mass, or the like.

(Water-Soluble Solvent)

It is preferable that the specific ink contains at least one water-soluble solvent.

In this manner, the effect of suppressing drying of the specific ink or the effect of wetting the specific ink can be obtained.

The water-soluble solvent which may be contained in the specific ink can be used, for example, as an anti-drying agent that prevents clogging due to aggregates formed by the specific ink being attached to an ink jet port of an injection nozzle of the ink jet head and being dried.

In the present disclosure, the term "water-soluble" indicates a property in which 1 g or greater of a substance is dissolved in 100 g of water at 25° C.

In the present disclosure, as the "water-soluble" property, a property in which 5 g or greater (more preferably 10 g or greater) of a substance is dissolved in 100 g of water at 25° C. is preferable.

From the viewpoints of suppressing drying of the ink and performing wetting of the ink, as the water-soluble solvent contained in the specific ink, a water-soluble solvent having a lower vapor pressure than that of water (hereinafter, also referred to as an "anti-drying agent") is preferable.

In addition, the boiling point of the water-soluble solvent at 1 atm (1013.25 hPa) is preferably in a range of 80° C. to 300° C. and more preferably in a range of 120° C. to 250° C.

Specific examples of the anti-drying agent include polyhydric alcohols represented by ethylene glycol, propylene glycol, diethylene glycol, polyethylene glycol, thiodiglycol, dithiodiglycol, 2-methyl-1,3-propanediol, 1,2,6-hexanetriol, an acetylene glycol derivative, glycerin, and trimethylolpropane.

Among these, polyhydric alcohol such as glycerin or diethylene glycol is preferable as the anti-drying agent.

The anti-drying agent may be used alone or in combination of two or more kinds thereof. The content of the anti-drying agent is preferably in a range of 5% by mass to 50% by mass, more preferably in a range of 10% by mass to 40% by mass, and still more preferably in a range of 10% by mass to 40% by mass with respect to the total amount of the specific ink.

The water-soluble solvent may be used for adjusting the viscosity of the ink in addition to other purposes described above.

Specific examples of the water-soluble solvent which can be used for adjusting the viscosity include alcohols (such as methanol, ethanol, propanol, isopropanol, butanol, isobutanol, sec-butanol, t-butanol, pentanol, hexanol, cyclohexanol, and benzyl alcohol), polyhydric alcohols (such as ethylene glycol, diethylene glycol, triethylene glycol, polyethylene glycol, propylene glycol, dipropylene glycol, polypropylene glycol, butylene glycol, hexanediol, pentanediol, glycerin, hexanetriol, and thiodiglycol), glycol derivatives (such as ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, and ethylene glycol monophenyl ether), amines (such as ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, and tetramethylpropylenediamine), and other polar solvents (such as formamide, N,N-dimethylformamide, N,N-dimethylacetamide, dimethyl sulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, and acetone).

In this case, the water-soluble solvent may also be used alone or in combination of two or more kinds thereof.

The content of the water-soluble solvent described above is preferably in a range of 5% by mass to 50% by mass, more preferably in a range of 10% by mass to 40% by mass, and still more preferably in a range of 10% by mass to 40% by mass with respect to the total amount of the specific ink.

(Other Additives)

The specific ink may contain components other than the components described above.

Examples of other components include known additives such as colloidal silica, an inorganic salt, a fading inhibitor, an emulsion stabilizer, a penetration enhancer, an ultraviolet absorbing agent, a preservative, a fungicide, a pH adjuster, a surface tension adjuster, an antifoaming agent, a viscosity adjuster, a dispersion stabilizer, a rust inhibitor, a chelating agent, and a water-soluble polymer compound.

(pH of Specific Ink)

The pH of the specific ink is greater than 4.5 and less than 9.5.

In this manner, generation of gas derived from the compound A (that is, the compound A that generates gas in an environment of a pH of 4.5 or less or 9.5 or greater) in the specific ink before the specific ink comes into contact with the treatment liquid is suppressed.

The pH of the specific ink is preferably 5 or greater and 9 or less.

In the present disclosure, the pH indicates a pH measured using a pH meter under the condition of a measurement temperature of 25° C.

(Viscosity of Specific Ink)

The viscosity of the specific ink is preferably 1 mPa·s or greater and 30 mPa·s or less and more preferably 1.5 mPa·s or greater and 20 mPa·s or less.

In the present disclosure, the viscosity indicates a value measured by a viscometer under the conditions of a measurement temperature of 23° C. and a shear rate of 1,400 s$^{-1}$.

For example, a TV-20 type viscometer (manufactured by Toki Sangyo Co., Ltd.) can be used as the viscometer.

(Surface Tension of Specific Ink)

The surface tension of the specific ink is preferably in a range of 20 mN/m to 60 mN/m, more preferably in a range of 20 mN/m to 45 mN/m, and still more preferably in a range of 25 mN/m to 40 mN/m.

In the present disclosure, the surface tension indicates a value measured by a plate method under a temperature condition of 25° C.

For example, an Automatic Surface Tensiometer CBVP-Z (manufactured by Kyowa Interface Science Co., Ltd.) can be used as the measuring device for measuring the surface tension.

<Specific Treatment Liquid>

The ink set of the present disclosure comprises at least one specific treatment liquid (that is, a treatment liquid having a pH of 4.5 or less or 9.5 or greater).

As described above, gas is generated from the compound A (that is, the compound A that generates gas in an environment of a pH of 4.5 or less or 9.5 or greater) in the process of recording an image by allowing the specific ink and the specific treatment liquid to come into contact with each other to record an image using the ink set of the present disclosure. In this manner, an image having voids is recorded. The voids in the image contribute to the effect of improving the covering property of the image.

From the viewpoint of further improving the covering property of the image, the absolute value of the difference between the pH of the specific treatment liquid and the pH of the specific ink (hereinafter, also referred to as the "absolute value of the pH difference") is preferably 2.5 or greater and more preferably 3 or greater.

The upper limit of the absolute value of the pH difference is preferably 7.5, more preferably 7, still more preferably 6, and even still more preferably 5.

The specific treatment liquid having a pH of 4.5 or less or 9.5 or greater may be achieved by allowing the specific treatment liquid to contain components (an aggregating agent and the like) described later, allowing the specific treatment liquid to contain a pH adjuster, or allowing the specific treatment liquid to contain a pH adjuster and components (an aggregating agent and the like) described below.

The pH adjuster is not particularly limited, and examples thereof include an inorganic acid (such as hydrochloric acid, sulfuric acid, nitric acid, or phosphoric acid), an inorganic base (such as an alkali metal hydroxide, an alkaline earth metal hydroxide, ammonia, or an ammonium salt), an organic base [such as an alkylammonium hydroxide (for example, a tetraalkylammonium hydroxide such as tetramethylammonium hydroxide), or an amine compound (for example, an alkanolamine such as triethanolamine)].

(Aggregating Agent)

It is preferable that the specific treatment liquid contains at least one aggregating agent selected from the group consisting of an organic acid, a polyvalent metal compound, a metal complex, and a water-soluble cationic polymer.

The aggregating agent has a function of aggregating components (for example, a white pigment and resin particles in a case where resin particles are contained) in the specific ink. Therefore, in a case where the specific treatment liquid contains an aggregating agent, the covering property of the image is further improved.

Organic Acid

As the organic acid, an organic compound containing an acidic group is exemplified.

Examples of the acidic group include a phosphoric acid group, a phosphonic acid group, a phosphinic acid group, a sulfuric acid group, a sulfonic acid group, a sulfinic acid group, and a carboxy group.

From the viewpoint of the aggregation rate of the ink, a phosphoric acid group or a carboxy group is preferable, and a carboxy group is more preferable as the acidic group.

Further, it is preferable that at least a part of the acidic group is dissociated in the treatment liquid.

Preferred examples of the organic compound containing a carboxy group include polyacrylic acid, acetic acid, formic acid, benzoic acid, glycolic acid, malonic acid, malic acid (preferably DL-malic acid), maleic acid, succinic acid, glutaric acid, fumaric acid, citric acid, tartaric acid, phthalic acid, 4-methylphthalic acid, lactic acid, pyrrolidone carboxylic acid, pyrrone carboxylic acid, pyrrole carboxylic acid, furan carboxylic acid, pyridine carboxylic acid, coumaric acid, thiophene carboxylic acid, and nicotinic acid. These compounds may be used alone or in combination of two or more kinds thereof.

From the viewpoint of the aggregation rate of the ink, as the organic compound containing a carboxy group, a di- or higher valent carboxylic acid (hereinafter, also referred to as a polyvalent carboxylic acid) is preferable.

As the polyvalent carboxylic acid, malonic acid, malic acid, maleic acid, succinic acid, glutaric acid, fumaric acid, tartaric acid, 4-methylphthalic acid, or citric acid is more preferable, and malonic acid, malic acid, tartaric acid, or citric acid is still more preferable.

It is preferable that the organic acid has a low pKa (for example, 1.0 to 5.0).

In this manner, the surface charge of particles such as polymer particles or the pigment stably dispersed in the ink by a weakly acidic functional group such as a carboxy group is reduced by bringing the ink into contact with an organic acidic compound having a lower pKa to degrade the dispersion stability.

It is preferable that the organic acid has a low pKa and a high solubility in water and is di- or higher valent and more preferable that the organic acid is a di- or trivalent acidic substance which has a high buffer capacity in a pH region whose pKa is lower than the pKa of the functional group (for example, a carboxy group) that allows the particles to be stably dispersed in the ink.

Polyvalent Metal Compound

Examples of the polyvalent metal compound include alkaline earth metals of a group 2 (such as magnesium and calcium) in the periodic table, transition metals of a group 3 (such as lanthanum) in the periodic table, cations of a group 13 (such as aluminum) in the periodic table, and salts of lanthanides (such as neodymium).

As salts of these metals, salts of the organic acids described above, a nitrate, a chloride, and a thiocyanate are suitable.

Among these, a calcium salt or magnesium salt of an organic acid (such as formic acid, acetic acid, or a benzoate), a calcium salt or magnesium salt of nitric acid, calcium chloride, magnesium chloride, and a calcium salt or magnesium salt of thiocyanic acid are preferable.

Further, it is preferable that at least a part of the polyvalent metal compound is dissociated into polyvalent metal ions and counter ions in the treatment liquid.

Metal Complex

As the metal complex, a metal complex including at least one selected from the group consisting of zirconium, aluminum, and titanium as a metallic element is preferable.

As the metal complex, a metal complex including at least one selected from the group consisting of acetate, acetylacetonate, methylacetoacetate, ethylacetoacetate, octylene glycolate, butoxyacetylacetonate, lactate, lactate ammonium salt, and triethanol aminate as a ligand is preferable.

As the metal complex, various metal complexes are commercially available, and a commercially available metal complex may be used in the present disclosure. Further, various organic ligands, particularly various multidentate ligands that are capable of forming metal chelate catalysts are commercially available. Accordingly, a metal complex prepared by combining a commercially available organic ligand with a metal may be used.

Examples of the metal complex include zirconium tetraacetyl acetonate (for example, "ORGATIX ZC-150", manufactured by Matsumoto Fine Chemical Co., Ltd.), zirconium monoacetyl acetonate (for example, "ORGATIX ZC-540", manufactured by Matsumoto Fine Chemical Co., Ltd.), zirconium bisacetyl acetonate (for example, "ORGATIX ZC-550", manufactured by Matsumoto Fine Chemical Co., Ltd.), zirconium monoethyl acetoacetate (for example, "ORGATIX ZC-560", manufactured by Matsumoto Fine Chemical Co., Ltd.), zirconium acetate (for example, "ORGATIX ZC-115", manufactured by Matsumoto Fine Chemical Co., Ltd.), titanium diisopropoxy bis(acetylacetonate) (for example, "ORGATIX TC-100", manufactured by Matsumoto Fine Chemical Co., Ltd.), titanium tetraacetyl acetonate (for example, "ORGATIX TC-401", manufactured by Matsumoto Fine Chemical Co., Ltd.), titanium dioctyloxy bis(octylene glycolate) (for example, "ORGATIX TC-200", manufactured by Matsumoto Fine Chemical Co., Ltd.), titanium diisopropoxy bis(ethylacetoacetate) (for example, "ORGATIX TC-750", manufactured by Matsumoto Fine Chemical Co., Ltd.), zirconium tetraacetyl acetonate (for example, "ORGATIX ZC-700", manufactured by Matsumoto Fine Chemical Co., Ltd.), zirconium tributoxy monoacetyl acetonate (for example, "ORGATIX ZC-540", manufactured by Matsumoto Fine Chemical Co., Ltd.), zirconium monobutoxy acetyl acetonate bis(ethylacetoacetate) (for example, "ORGATIX ZC-570", manufactured by Matsumoto Fine Chemical Co., Ltd.), zirconium dibutoxy bis(ethylacetoacetate) (for example, "ORGATIX ZC-580", manufactured by Matsumoto Fine Chemical Co., Ltd.), aluminum trisacetyl acetonate (for example, "ORGATIX AL-80", manufactured by Matsumoto Fine Chemical Co., Ltd.), titanium lactate ammonium salt (for example, "ORGATIX TC-300", manufactured by Matsumoto Fine Chemical Co., Ltd.), titanium lactate (for example, "ORGATIX TC-310, 315", manufactured by Matsumoto Fine Chemical Co., Ltd.), titanium triethanol aminate (for example, "ORGATIX TC-400", manufactured by Matsumoto Fine Chemical Co., Ltd.), and a zirconyl chloride compound (for example, "ORGATIX ZC-126", manufactured by Matsumoto Fine Chemical Co., Ltd.).

Among these, titanium lactate ammonium salt (for example, "ORGATIX TC-300", manufactured by Matsumoto Fine Chemical Co., Ltd.), titanium lactate (for example, "ORGATIX TC-310, 315", manufactured by Matsumoto Fine Chemical Co., Ltd.), titanium triethanol aminate (for example, "ORGATIX TC-400", manufactured by Matsumoto Fine Chemical Co., Ltd.), and a zirconyl chloride compound (for example, "ORGATIX ZC-126", manufactured by Matsumoto Fine Chemical Co., Ltd.) are preferable.

Water-Soluble Cationic Polymer

Examples of the water-soluble cationic polymer include polyallylamine, polyallylamine derivatives, poly-2-hydroxypropyldimethylammonium chloride, and poly(diallyldimethylammonium chloride).

The water-soluble cationic polymer can refer to the descriptions in known documents such as JP2011-042150A (particularly, paragraph 0156) and JP2007-98610A (particularly, paragraphs 0096 to 0108) as appropriate.

Examples of commercially available products of the water-soluble cationic polymer include SHALLOL (registered trademark) DC-303P and SHALLOL DC-902P (both manufactured by DKS Co., Ltd.), CATIOMASTER (registered trademark) PD-land CATIOMASTER PD -30 (both manufactured by Yokkaichi Chemical Co., Ltd.) and UNISENCE FPA100L (manufactured by Senka Corporation).

The content of the aggregating agent with respect to the total amount of the specific treatment liquid is not particularly limited, but is preferably in a range of 0.1% by mass to 40% by mass, more preferably in a range of 0.1% by mass to 30% by mass, still more preferably in a range of 1% by mass to 20% by mass, and particularly preferably in a range of 1% by mass to 10% by mass.

From the viewpoint of further improving the covering property of the image, it is preferable that the aggregating agent contains an organic acid.

The preferable ranges of the content of the organic acid with respect to the entire specific treatment liquid in a case where the aggregating agent contains an organic acid are the same as those of the content of the aggregating agent with respect to the total amount of the specific treatment liquid described above.

In a case where the aggregating agent contains an organic acid, the proportion of the organic acid in the total amount of the aggregating agent is preferably in a range of 50% by mass to 100% by mass, more preferably in a range of 80% by mass to 100% by mass, and still more preferably in a range of 90% by mass to 100% by mass.

(Water)

It is preferable that the specific treatment liquid contains water.

The content of water is preferably 50% by mass or greater and more preferably 60% by mass or greater with respect to the total amount of the specific treatment liquid.

The upper limit of the content of water depends on the amount of other components. The upper limit of the content of water with respect to the total amount of the specific treatment liquid may be 90% by mass, 80% by mass, or the like.

(Resin Particles)

The specific treatment liquid may contain at least one kind of resin particles.

In a case where the specific treatment liquid contains resin particles, the adhesiveness of the image is further improved.

From the viewpoint of further improving the adhesiveness of the image to be obtained, the Tg of the resin particles is preferably 100° C. or lower and more preferably 75° C. or lower.

The resin contained in the resin particles is not particularly limited, and examples thereof include a polyurethane resin, a polyamide resin, a polyurea resin, a polycarbonate resin, a polyolefin resin, a polystyrene resin, a polyester resin, and an acrylic resin.

The resin particles contains preferably a polyester resin and/or an acrylic resin and more preferably a polyester resin.

Alicyclic Structure or Aromatic Ring Structure

The resin contained in the resin particles has preferably an alicyclic structure or an aromatic ring structure and more preferably an aromatic ring structure in the structure.

As the alicyclic structure, an alicyclic hydrocarbon structure having 5 to 10 carbon atoms is preferable, and a cyclohexane ring structure, a dicyclopentanyl ring structure, a dicyclopentenyl ring structure, or an adamantane ring structure is preferable.

As the aromatic ring structure, a naphthalene ring or a benzene ring is preferable, and a benzene ring is more preferable.

The amount of the alicyclic structure or the aromatic ring structure is, for example, preferably in a range of 0.01 mol to 1.5 mol and more preferably in a range of 0.1 mol to 1 mol per 100 g of the resin contained in the resin particles.

Ionic Group

It is preferable that the resin particles have water dispersibility. From such a viewpoint, it is preferable that the resin contained in the resin particles contains an ionic group in the structure.

The ionic group may be an anionic group or a cationic group, but an anionic group is preferable from the viewpoint of ease of introduction.

The anionic group is not particularly limited, but a carboxy group or a sulfo group is preferable, and a sulfo group is more preferable.

The amount of the ionic group is, for example, preferably in a range of 0.001 mol to 1.0 mol and more preferably in a range of 0.01 mol to 0.5 mol per 100 g of the resin contained in the resin particles.

The content of resin particles is not particularly limited.

The content of resin particles is preferably in a range of 0.5% by mass to 30% by mass, more preferably in a range of 1% by mass to 20% by mass, and particularly preferably in a range of 1% by mass to 15% by mass with respect to the total amount of the specific treatment liquid.

(Water-Soluble Solvent)

It is preferable that the specific treatment liquid contains at least one kind of water-soluble solvent.

As the water-soluble solvent, known solvents can be used without particular limitation.

Examples of the water-soluble solvent include polyhydric alcohol such as glycerin, 1,2,6-hexanetriol, trimethylolpropane, alkanediol (such as ethylene glycol, propylene glycol (1,2-propanediol), 1,3-propanediol, 1,3-butanediol, 1,4-butanediol, 2-butene-1,4-diol, 2-ethyl-1,3-hexanediol, 2-methyl-2,4-pentanediol, 1,2-octanediol, 1,2-hexanediol, 1,2-pentanediol, or 4-methyl-1,2-pentanediol), or polyalkylene glycol (such as diethylene glycol, triethylene glycol, tetraethylene glycol, pentaethylene glycol, dipropylene glycol, or polyoxyethylene polyoxypropylene glycol); polyhydric alcohol ether such as polyalkylene glycol ether (such as diethylene glycol monoalkyl ether, triethylene glycol monoalkyl ether, tripropylene glycol monoalkyl ether, or polyoxypropylene glyceryl ether); and saccharides, sugar alcohols, hyaluronic acids, alkyl alcohols having 1 to 4 carbon atoms, glycol ethers, 2-pyrrolidone, and N-methyl-2-pyrrolidone described in paragraph 0116 of JP2011-42150A.

Among these, from the viewpoint of suppressing transfer of components, polyhydric alcohol or polyhydric alcohol ether is preferable, and alkanediol, polyalkylene glycol, or polyalkylene glycol ether is more preferable.

(Surfactant)

The specific treatment liquid may contain at least one kind of surfactant.

The surfactant can be used as a surface tension adjuster or an antifoaming agent. Examples of the surface tension adjuster or the antifoaming agent include a non-ionic surfactant, a cationic surfactant, an anionic surfactant, and a betaine surfactant. Among these, from the viewpoint of the aggregation rate of the specific ink, a non-ionic surfactant or an anionic surfactant is preferable.

Examples of the surfactant include compounds exemplified as surfactants in pp. 37 and 38 of JP1984-157636A (JP-S59-157636A) and Research Disclosure No. 308119 (1989). Further, other examples of the surfactant include fluorine-based (fluorinated alkyl-based) surfactants and silicone-based surfactants described in JP2003-322926A, JP2004-325707A, and JP2004-309806A.

In a case where the specific treatment liquid contains a surfactant, the content of the surfactant in the specific treatment liquid is not particularly limited, but the content thereof can be set such that the surface tension of the specific treatment liquid reaches preferably 50 mN/m or less, more preferably in a range of 20 mN/m to 50 mN/m, and still more preferably in a range of 30 mN/m to 45 mN/m.

For example, in a case where the specific treatment liquid contains a surfactant as an antifoaming agent, the content of the surfactant as an antifoaming agent is preferably in a range of 0.0001% by mass to 1% by mass and more preferably in a range of 0.001% by mass to 0.1% by mass with respect to the total amount of the specific treatment liquid.

(Other Components)

The specific treatment liquid may contain components other than those described above as necessary.

Examples of other components that may be contained in the specific treatment liquid include known additives such as a solid wetting agent, colloidal silica, an inorganic salt, a fading inhibitor, an emulsion stabilizer, a penetration enhancer, an ultraviolet absorbing agent, a preservative, a fungicide, a pH adjuster, a viscosity adjuster, a rust inhibitor, a chelating agent, and a water-soluble polymer compound other than a water-soluble cationic polymer (for example, water-soluble polymer compounds described in paragraphs 0026 to 0080 of JP2013-001854A).

(pH of Specific Treatment Liquid)

As described above, the pH of the specific treatment liquid is 4.5 or less or 9.5 or greater.

The pH of the specific treatment liquid having a pH of 4.5 or less is preferably 1.0 or greater and 4.5 or less, more preferably 2.0 or greater and 4.5 or less, and still more preferably 3.0 or greater and 4.5 or less.

The pH of the specific treatment liquid having a pH of 9.5 or greater is preferably 9.5 or greater and 14.0 or less, more preferably 9.5 or greater and 13.0 or less, still more preferably 9.5 or greater and 12.0 or less, and even still more preferably 9.5 or greater and 11.0 or less.

The conditions for measuring the pH of the specific treatment liquid are the same as the conditions for measuring the pH of the specific ink described above.

(Viscosity of Specific Treatment Liquid)

The viscosity of the specific treatment liquid is preferably in a range of 0.5 mPa·s to 10 mPa·s and more preferably in a range of 1 mPa·s to 5 mPa·s.

The conditions for measuring the viscosity of the specific treatment liquid are the same as the conditions for measuring the viscosity of the specific ink described above.

(Surface Tension of Specific Treatment Liquid)

The surface tension of the specific treatment liquid is preferably 60 mN/m or less, more preferably in a range of 20 mN/m to 50 mN/m, and still more preferably in a range of 30 mN/m to 45 mN/m.

The conditions for measuring the surface tension of the specific treatment liquid are the same as the conditions for measuring the surface tension of the specific ink described above.

[Image Recording Method]

An image recording method of the present disclosure is an image recording method for which the ink set of the present disclosure described above is used.

The image recording method of the present disclosure includes a step of applying the treatment liquid on a base material (hereinafter, also referred to as a "treatment liquid adding step"), and a step of applying the specific ink onto a surface of the base material onto which the specific treatment liquid has been applied, to record an image (hereinafter, also referred to as an "image recording step").

The image recording method of the present disclosure may include other steps as necessary.

According to the image recording method of the present disclosure, an image with an excellent covering property and excellent adhesiveness can be recorded.

The reason why these effects can be obtained is as described above.

<Base Material>

The base material in the image recording method of the present disclosure is not particularly limited, and examples thereof include paper, coated paper, a resin base material, a metal, a ceramic, glass, and a textile base material.

According to the image recording method of the present disclosure, since an image with an excellent covering property and excellent adhesiveness can be obtained, an impermeable base material is preferable as the base material in the image recording method of the present disclosure.

In the present disclosure, the "impermeable base material" indicates a base material that absorbs less water or does not absorb water. Specifically, the "impermeable base material" indicates a base material having a water absorption amount of 0.3 g/m$^2$ or less.

The water absorption amount (g/m$^2$) of the base material is measured as follows.

Water is brought into contact with a region having a size of 100 mm×100 mm in the front surface of the base material (that is, the surface to which an image is recorded), and the state is maintained at 25° C. for 1 minute. The mass (absorption amount (g)) of water absorbed by maintaining the state for 1 minute is acquired, and the obtained absorption amount (g) is converted to the absorption amount per unit area (g/m$^2$).

The impermeable base material is not particularly limited, but a resin base material is preferable.

The resin base material is not particularly limited, and examples thereof include a base material formed of a thermoplastic resin.

A base material obtained by molding a thermoplastic resin in the form of a sheet is exemplified as the resin base material.

It is preferable that the resin base material contains polypropylene, polyethylene terephthalate, nylon, polyethylene, or polyimide.

The resin base material may be a transparent resin base material or a colored resin base material, and at least a part thereof may be subjected to a metal vapor deposition treatment or the like.

In the present disclosure, the term "transparent" indicates that the minimum transmittance at a wavelength of 400 nm to 700 nm at 23° C. is 80% or greater (preferably 90% or greater and more preferably 95% or greater). The minimum transmittance is measured in every 1 nm using a spectrophotometer (for example, spectrophotometer UV-2100, manufactured by Shimadzu Corporation).

The shape of the resin base material is not particularly limited, but a sheet-shaped resin base material is preferable. From the viewpoint of the productivity of the image recorded material, a sheet-shaped resin base material which is capable of forming a roll by being wound is more preferable.

The thickness of the resin base material is preferably in a range of 10 μm to 200 μm and more preferably in a range of 10 μm to 100 μm.

<Treatment Liquid Adding Step>

The image recording method of the present disclosure includes a treatment liquid adding step (that is, a step of applying the treatment liquid onto the base material).

The application of the treatment liquid onto the base material can be performed by employing a known method such as a coating method, an ink jet method, or a dipping method.

Examples of the coating method include known coating methods using a bar coater (such as a wire bar coater), an extrusion die coater, an air doctor coater, a blade coater, a rod coater, a knife coater, a squeeze coater, a reserve roll coater, a gravure coater, or a flexo coater.

The details of the ink jet method are the same as the details of the ink jet method which can be applied to the image recording step described above.

The mass (X g/m$^2$ described below) of the treatment liquid to be applied per unit area is preferably in a range of 0.1 g/m$^2$ to 10 g/m$^2$, more preferably in a range of 0.5 g/m$^2$ to 6.0 g/m$^2$, still more preferably in a range of 0.8 g/m$^2$ to 2.0 g/m$^2$, and even still more preferably in a range of 1.2 g/m$^2$ to 1.6 g/m$^2$.

In the treatment liquid adding step, the treatment liquid may be heated and dried after the application of the treatment liquid and before the image recording step (that is, before the application of the ink).

Examples of the means for heating and drying the treatment liquid include known heating means such as a heater, known air blowing means such as a dryer, and means for combining these.

Examples of the method of heating and drying the treatment liquid include a method of applying heat using a heater or the like from a side of the base material opposite to the surface onto which the treatment liquid has been applied, a method of applying warm air or hot air to the surface of the base material onto which the treatment liquid has been applied, a method of applying heat using an infrared heater from the surface of the base material onto which the treatment liquid has been applied or from a side of the base material opposite to the surface onto which the treatment liquid has been applied, and a method of combining a plurality of these methods.

The heating temperature of heating and drying the treatment liquid is preferably 35° C. or higher and more preferably 40° C. or higher.

The upper limit of the heating temperature is not particularly limited, and the upper limit thereof is preferably 100° C., more preferably 90° C., and still more preferably 70° C.

The time of heating and drying the treatment liquid is not particularly limited, but is preferably in a range of 0.5 seconds to 60 seconds, more preferably in a range of 0.5 seconds to 20 seconds, and particularly preferably in a range of 0.5 seconds to 10 seconds.

<Image Recording Step>

The image recording method of the present disclosure includes an image recording step (that is, a step of applying the specific ink onto the surface of the base material onto which the specific treatment liquid has been applied to record an image).

The application of the specific ink can be performed by employing a known method such as a coating method, an ink jet method, or a dipping method, but it is preferable that the application is performed by the ink jet method from the viewpoint of recording a fine image.

As the ink jet method, a known ink jet method can be employed.

The jetting method for the specific ink in the ink jet method is not particularly limited, and any of known methods such as an electric charge control method of allowing an ink to be jetted using an electrostatic attraction force; a drop-on-demand method (pressure pulse method) using a vibration pressure of a piezoelectric element; an acoustic ink jet method of allowing an ink to be jetted using a radiation pressure by converting an electric signal into an acoustic beam and irradiating the ink with the acoustic beam; or a thermal ink jet (also referred to as a bubble jet (registered trademark)) method of heating an ink to form air bubbles and utilizing the generated pressure may be used.

As an ink jet method, particularly, an ink jet method, described in JP1979-59936A (JP-S54-59936A), of jetting an ink from a nozzle using an action force caused by a rapid change in volume of the ink after being subjected to an action of thermal energy can be effectively used.

Further, the method described in paragraphs 0093 to 0105 of JP2003-306623A can also be employed as the ink jet method.

The application of the specific ink according to the ink jet method is performed by allowing the specific ink to be jetted from a nozzle of an ink jet head.

Examples of the system of the ink jet head include a shuttle system of performing recording while scanning a short serial head in the width direction of the base material and a line system of using a line head in which recording elements are aligned in correspondence with the entire area of one side of the base material.

In the line system, image recording can be performed on the entire surface of the base material by scanning the base material in a direction intersecting the direction in which the recording elements are aligned. In the line system, a transport system such as a carriage that scans a short head in the shuttle system is not necessary. Further, in the line system, since the movement of a carriage and complicated scanning control between the head and the base material are not necessary as compared with the shuttle system, only the base material moves. Therefore, according to the line system, image recording at a higher speed than that of the shuttle system can be realized.

From the viewpoint of obtaining a high-definition image, the liquid droplet amount of the specific ink to be jetted from the nozzle of the ink jet head is preferably in a range of 1 pL (pico liter) to 10 pL and more preferably in a range of 1.5 pL to 6 pL.

In addition, from the viewpoints of improving the image unevenness and improving connection of continuous gradations, it is also effective that the ink is jetted by combining different amounts of liquid droplets.

Further, the ink jet head may comprise a liquid-repellent film on the surface onto which the specific ink is jetted (ink jetted surface). Examples of the liquid-repellent film include those described in paragraphs 0178 to 0184 of JP2016-193980A.

The mass of the specific ink to be applied per unit area (Y $g/m^2$ described below) in the image recording step is preferably in a range of 4.5 $g/m^2$ to 25 $g/m^2$, more preferably in a range of 5.5 $g/m^2$ to 20 $g/m^2$, and still more preferably in a range of 9 $g/m^2$ to 12 $g/m^2$.

In the image recording step, the applied specific ink may be heated and dried.

Examples of the means for heating and drying the ink include known heating means such as a heater, known air blowing means such as a dryer, and means for combining these.

Examples of the method for heating and drying the specific ink include a method of applying heat using a heater or the like from a side of the base material opposite to the surface onto which the specific ink has been applied, a method of applying warm air or hot air onto the surface of the base material onto which the specific ink has been applied, a method of applying heat using an infrared heater from the surface of the base material onto which the specific ink has been applied or from a side of the base material opposite to the surface onto which the specific ink has been applied, and a method of combining a plurality of these methods.

The heating temperature in a case of heating and drying the specific ink is preferably 55° C. or higher, more preferably 60° C. or higher, and particularly preferably 65° C. or higher.

The upper limit of the heating temperature for the specific ink is not particularly limited, and the upper limit thereof is preferably 100° C. and more preferably 90° C. or higher.

The time of heating and drying the specific ink is not particularly limited, but is preferably in a range of 3 seconds to 60 seconds, more preferably in a range of 5 seconds to 60 seconds, and particularly preferably in a range of 10 seconds to 45 seconds.

Further, in the image recording step, the base material to which the treatment liquid has been applied may be heated before the application of the specific ink.

The heating temperature may be appropriately set according to the kind of the base material, the composition of the specific ink, and the like, but the temperature of the base material is set to be preferably in a range of 20° C. to 50° C. and more preferably in a range of 25° C. to 40° C.

In a case where the treatment liquid is heated and dried in the treatment liquid adding step described above, the heating for heating and drying the treatment liquid may also serve as the heating of the base material before the application of the ink.

In the image recording method of the present disclosure, in a case where the amount of the specific treatment liquid to be applied per unit area in the treatment liquid adding step is defined as X g/m$^2$ and the amount of the specific ink to be applied per unit area in the image recording step is defined as Y g/m$^2$, the ratio of Y/X is preferably 2 or greater and 28 or less, more preferably 3 or greater and 25 or less, still more preferably 4.5 or greater and 20 or less, even still more preferably 6 or greater and 15 or less, and even still more preferably 6 or greater and 10 or less.

<Other Steps>

The image recording method of the present disclosure may further include other steps.

Examples of other steps include a step of applying a black or chromatic ink (hereinafter, also referred to as a "colored ink") onto the base material to record a black or chromatic image (hereinafter, also referred to as a "colored image").

The colored ink may be comprised in the ink set of the present disclosure or may be prepared separately from the ink set of the present disclosure.

The step of recording a colored image may be performed before the image recording step (preferably before the image recording step described above and after the treatment liquid adding step) described above.

In this case, an image (for example, a white solid image) is recorded with the specific ink on the colored image (for example, a pattern image of a character, a figure, or the like) recorded by the step of recording the colored image. In this manner, a colored image can be recorded between the base material and the image (for example, a white solid image) recorded with the specific ink.

In a case where such an image is recorded, a transparent base material is preferably used. In this case, a colored image (for example, a pattern image of a character, a figure, or the like) using the image recorded with the specific ink (for example, a white solid image) as a base can be visually recognized through the base material in a case of observation from the surface side of the base material where the image has not been recorded (that is, the surface on which the image has not been recorded). Meanwhile, the colored image and the base material are hidden by the image recorded with the specific ink in a case of observation from the surface side of the base material where the image has been recorded (that is, the surface on which the image has been recorded), and thus the colored image and the base material are unlikely to be visually recognized.

Further, the step of recording a colored image may be performed after the image recording step described above.

A colored image (for example, a pattern image of a character, a figure, or the like) can be recorded on an image (for example, a white solid image) recorded with the specific ink. In this case, a colored image (for example, a pattern image of a character, a figure, or the like) using the image recorded with the specific ink (for example, a white solid image) as a base can be visually recognized in a case of observation from the surface side of the base material where the image has been recorded. Meanwhile, the colored image is hidden by the image recorded with the specific ink in a case of observation from the surface side of the base material where the image has not been recorded, and thus the colored image is unlikely to be visually recognized.

The method of applying the colored ink is not particularly limited, and examples thereof include the same methods as those for the ink jet method described in the section of the image recording step described above.

The colored ink is not particularly limited, and examples thereof include known aqueous inks.

Only one or two or more kinds of colored inks may be applied. A polychromic image can be recorded by applying two or more kinds of colored inks.

[Image Recorded Material]

An image recorded material of the present disclosure is an image recorded material comprising a base material (preferably an impermeable base material, the same applies hereinafter) and an image disposed on the base material and containing a resin and a white pigment, in which the void volume in the image is 1% or greater and 30% or less.

The image in the image recorded material of the present disclosure has an excellent covering property and excellent adhesiveness.

The fact that the void volume is 1% or greater contributes to the effect of the covering property.

The fact that the void volume is 30% or less contributes to the effect of the adhesiveness.

From the viewpoint of further improving the covering property and the adhesiveness of the image, the void volume in the image is preferably 5% or greater and 25% or less and more preferably 10% or greater and 15% or less.

In the present disclosure, the void volume in the image indicates a value measured in the following manner.

A cross section of the image is observed with a scanning electron microscope (SEM) to obtain an SEM image (at a magnification of 25000 times).

Based on the SEM image, the void volume in the image is calculated by the following equation.

$$\text{Void volume (\%) in image} = ((\text{total area of voids})/(\text{total area of image including voids})) \times 100$$

The SEM image is acquired using, for example, a Helios 400S FIB-SEM multifunction machine (manufactured by Thermo Fisher Scientific).

The image recorded material of the present disclosure can be suitably produced by the image recording method of the present disclosure described above.

In this case, the resin in the image is derived from at least the resin (that is, the entire resin) in the specific ink. In a case where the treatment liquid contains resin particles, the resin in the image is derived from the resin in the specific ink and the resin particles in the treatment liquid.

The white pigment in the image is derived from the white pigment in the specific ink.

The voids in the image are derived from the gas generated by allowing the compound A in the specific ink and the treatment liquid to come into contact with each other.

The preferred embodiments of the base material in the image recorded material of the present disclosure can appropriately refer to the section of the image recording method.

The components of the image in the image recorded material of the present disclosure can appropriately refer to the section of the ink set.

The image recorded material of the present disclosure may comprise not only an image containing a resin and a white pigment but also the above-described colored image.

[Laminate]

The image recorded material of the present disclosure may further comprise a base material for lamination which is disposed on the image disposed on the base material.

Hereinafter, the image recorded material in this form will be referred to as a laminate.

The laminate is obtained, for example, by laminating a base material for lamination on the side of the image recorded material where the image has been disposed.

The base material for lamination may be laminated directly on a side of the image recorded material where the image has been recorded or through another layer (for example, an adhesive layer).

The base material for lamination in a case of being directly laminated on a side of the image recorded material where the image has been recorded can be laminated according to a known method such as thermocompression bonding or thermal fusion welding.

Further, the base material for lamination in a case of being laminated through an adhesive layer on a side of the image recorded material where the image has been recorded can be laminated, for example, according to a method of coating the side of the image recorded material where the image has been recorded with an adhesive, placing the base material for lamination, and bonding the image recorded material to the base material for lamination.

Further, the base material for lamination in the case of being laminated through an adhesive layer on a side of the image recorded material where the image has been recorded can be laminated according to an extrusion lamination method (that is, sandwich lamination) or the like.

It is preferable that the adhesive layer in the mode of laminating the base material through the adhesive layer on a side of the image recorded material where the image has been recorded contains an isocyanate compound.

In a case where the adhesive layer contains an isocyanate compound, since the adhesiveness between the adhesive layer and the image is further improved, the lamination strength can be further improved.

As the base material for lamination, a resin base material is preferable.

The resin base material is not particularly limited, and examples thereof include a base material formed of a thermoplastic resin.

A base material obtained by molding a thermoplastic resin in the form of a sheet is exemplified as the resin base material.

It is preferable that the resin base material contains polypropylene, polyethylene terephthalate, nylon, polyethylene, or polyimide.

The shape of the resin base material is not particularly limited, but it is preferable that the resin base material is in the form of a sheet.

The thickness of the resin base material is preferably in a range of 10 µm to 200 µm and more preferably in a range of 10 µm to 100 µm.

[Image Recording Device]

The image recording method of the present disclosure can be carried out using, for example, a known ink jet recording device.

Examples of the known ink jet recording device include known ink jet recording devices described in JP2010-83021A, JP2009-234221A, and JP1998-175315A (JP-H10-175315A).

Hereinafter, an example of the image recording device which can be used for the image recording method of the present disclosure will be described with reference to FIG. 1.

The image recording device illustrated in FIG. 1 comprises a treatment liquid applying unit that applies the treatment liquid, and an image recording unit that performs an ink jet method.

Here, FIG. 1 is a schematic configuration view illustrating a configuration example of the image recording device.

As illustrated in FIG. 1, the image recording device includes a treatment liquid applying unit 12 comprising an anilox roller 20 and a coating roller 22 that is brought into contact with the anilox roller 20 as the roller materials used for sequentially applying the treatment liquid from a supply unit 11 of the base material toward the transport direction (the arrow direction in FIG. 1) of the base material; a treatment liquid drying zone 13 comprising a heating unit (not illustrated) used for drying the applied treatment liquid; an ink jetting unit 14 which jets various inks; and an ink drying zone 15 where the jetted ink is dried.

The supply unit 11 of the base material in the image recording device may be a supply unit that supplies the base material from a case which is charged with the base material or a supply unit that supplies the base material from a roll around which the base material is wound in a roll shape.

The base material is sequentially sent by transport rollers 41, 42, 43, 44, 45, and 46 from the supply unit 11 through the treatment liquid applying unit 12, the treatment liquid drying zone 13, the ink jetting unit 14, and the ink drying zone 15, and then accumulated in an accumulation unit 16.

In the accumulation unit 16, the base material may be wound in a roll shape.

As the method of transporting the base material, a drum transport method using a drum-shaped member, a belt transport method, or a stage transport method using a stage may be employed in addition to the method of transporting the base material using a transport roller as illustrated in FIG. 1.

Among the plurality of arranged transport rollers 41, 42, 43, 44, 45, and 46, at least one transport roller can be formed into a driving roller to which the power of a motor (not illustrated) has been transmitted.

The base material is transported at a predetermined transportation speed in a predetermined direction by rotating the driving roller rotating by the motor at a constant speed.

The treatment liquid applying unit 12 is provided with the anilox roller 20 disposed by being partially immersed in a storage tray in which the specific treatment liquid is stored and the coating roller 22 brought into contact with the anilox roller 20. The anilox roller 20 is a roller material for supplying a predetermined amount of the specific treatment liquid to the coating roller 22 disposed to oppose the image recorded surface of the base material. The base material is uniformly coated with the specific treatment liquid by the coating roller 22 to which an appropriate amount of the specific treatment liquid has been supplied from the anilox roller 20.

The coating roller 22 is configured so as to transport the base material in a pair with an opposing roller 24, and the base material passes between the coating roller 22 and the opposing roller 24 and is sent to the treatment liquid drying zone 13.

The treatment liquid drying zone 13 is disposed downstream of the treatment liquid applying unit 12 in the transport direction of the base material.

The treatment liquid drying zone 13 can be configured using known heating means such as a heater, air blowing means for blowing air such as a dryer or an air knife, and means for combining these.

Examples of the heating means include a method of installing a heating element such as a heater on a side of the base material opposite to the surface (that is, the image recorded surface) to which the treatment liquid has been applied (for example, in a case where the base material is automatically transported, below the transport mechanism for mounting and transporting the base material), a method of applying warm air or hot air to the surface of the base material to which the treatment liquid has been applied (that is, the image recorded surface), and a heating method using an infrared heater. Further, the heating means may be a combination of a plurality of the above-described methods.

In the treatment liquid drying zone 13, the solvent may be removed from the specific treatment liquid using a solvent removal roller or the like.

The ink jetting unit 14 is disposed downstream of the treatment liquid drying zone 13 in the transport direction of the base material.

In the ink jetting unit 14, recording heads (ink jet heads) 30K, 30C, 30M, 30Y, 30A, and 30W that are respectively connected to ink storage units storing inks with respective colors, which are black (K), cyan (C), magenta (M), yellow (Y), a special color ink (A), and white (W) are arranged. The respective ink storage units (not illustrated) are configured such that the inks containing colorants corresponding to each color tone and water are stored and supplied to respective ink jet heads 30K, 30C, 30M, 30Y, 30A, and 30W as necessary during image recording.

Since the specific ink of the present disclosure is preferably a white ink, it is preferable that the ink jet head 30W is an ink jet head used for jetting the specific ink.

In FIG. 1, the ink jet head 30W is disposed downstream (the most downstream side) of the ink jet head 30A, but may be disposed upstream of the ink jet head 30K.

Examples of the special color ink (A) include orange ink, green ink, purple ink, light cyan ink, and light magenta ink.

In the image recording device applied to the image recording method of the present disclosure, the ink jet head 30A may not be provided. Further, the image recording device may comprise other special color ink jet heads in addition to the ink jet head 30A.

Further, it is described that the ink jet head 30A is positioned downstream of the yellow (Y) ink jet head 30Y in the transport direction of the base material in FIG. 1 for convenience, but the position thereof is not particularly limited and may be appropriately set in consideration of the brightness or the like of the special color inks.

For example, a form in which the ink jet head 30A is positioned between the yellow ink jet head 30Y and the magenta ink jet head 30M or a form in which the ink jet head 30A is positioned between the magenta ink jet head 30M and the cyan ink jet head 30C is considered.

The ink jet heads 30K, 30C, 30M, 30Y, 30A, and 30W jet inks are used to jet inks corresponding to each image from jetting nozzles arranged to oppose the image recorded surface of the base material. In this manner, each color ink is applied onto the image recorded surface of the base material, and thus a color image is recorded.

The ink jet heads 30K, 30C, 30M, 30Y, 30A, and 30W are all full line heads in which a plurality of jet ports (nozzles) are aligned over the maximum recording width (maximum recording width) of an image to be recorded on the surface of the base material. The image recording can be performed on the base material at a higher speed as compared to a serial type head in which recording is performed while reciprocating and scanning a short shuttle head in the width direction (a direction orthogonal to the transport direction of the base material) of the base material.

In the present disclosure, any recording system, for example, a system that enables serial type recording or recording at a relatively high speed, such as a single pass system of forming one line by performing scanning once may be employed. According to the image recording method of the present disclosure, a high-quality image with excellent reproducibility can be obtained even with the single pass system.

Here, the ink jet heads 30K, 30C, 30M, 30Y, 30A, and 30W all have the same structure.

It is preferable that the amount of the treatment liquid to be applied and the amount of the ink to be applied are adjusted as necessary. For example, the amount of the treatment liquid to be applied may be changed in order to adjust the physical properties such as the viscoelasticity and the like of the aggregate obtained by mixing the treatment liquid with the ink, depending on the base material.

The ink drying zone 15 is disposed downstream of the ink jetting unit 14 in the transport direction of the base material.

The ink drying zone 15 can be configured in the same manner as the treatment liquid drying zone 13.

The image recording device may further comprise a heating unit that performs a heat treatment on the base material in a transport path from the supply unit 11 to the accumulation unit 16.

For example, drying of the treatment liquid and drying and fixing of the ink can be effectively performed by disposing the heating unit at a desired position such as upstream of the treatment liquid drying zone 13 or between the ink jetting unit 14 and the ink drying zone 15 so that the base material is heated to a desired temperature.

Further, since the surface temperature of the base material changes depending on the kind (the material, the thickness, or the like) of the base material, the environmental temperature, and the like, it is preferable that the image recording device comprises a heating control mechanism including a measuring unit that measures the surface temperature of the base material; a heating control unit that controls the heating conditions; and a control unit that feeds back the value of the surface temperature of the base material measured by the measuring unit to the heating control unit.

In a case where the image recording device comprises the heating control mechanism, application of the treatment liquid and application of the ink can be performed while the temperature of the base material is controlled.

As the measuring unit that measures the surface temperature of the base material, a contact or non-contact type thermometer is preferable.

EXAMPLES

Hereinafter, examples of the present disclosure will be described below, but the present disclosure is not limited to the following examples.

Hereinafter, "parts" and "%" are on a mass basis unless otherwise specified.

Example 1

An ink and a treatment liquid were respectively prepared to prepare an ink set comprising the ink and the treatment liquid.

Hereinafter, the details will be described.
<Preparation of Ink>
(Synthesis of resin particles P1)

Resin particles P1 serving as a component in the ink were synthesized. Hereinafter, the details will be described.

A three-neck flask provided with a stirrer, a thermometer, a reflux condenser, and a nitrogen gas introduction pipe was charged with methyl ethyl ketone (281 g) and heated to 85° C. A mixed solution formed of methyl methacrylate (208 g), isobornyl methacrylate (60 g), methacrylic acid (30 g), methyl ethyl ketone (66 g), and "V-601" (manufactured by Fujifilm Wako Pure Chemical Corporation) (0.66 g) was added dropwise to the methyl ethyl ketone at a constant speed such that the dropwise addition was completed for 3 hours while the reflux state was maintained in the reaction container. After the completion of the dropwise addition, (1) the solution was stirred for 1 hour, a solution formed of "V-601" (0.66 g) and methyl ethyl ketone (3.5 g) was added thereto, and the resulting solution was stirred for 2 hours. Subsequently, the step of (1) was repeated four times, and a solution formed of "V-601" (0.66 g) and methyl ethyl ketone (3.5 g) was further added thereto, and the resulting solution was continuously stirred for 3 hours. After the temperature was lowered to 60° C., isopropyl alcohol (83 g) was added thereto.

Next, 155 g of the polymerization solution (the concentration of solid contents: 40% by mass) was weighed, and methyl ethyl ketone (7 g), isopropyl alcohol (23.1 g), a 20% maleic acid anhydride aqueous solution (0.6 g), and 2 mol/L of a sodium hydroxide (NaOH) aqueous solution (20 g) were added, and the temperature inside the reaction container was raised to 70° C. Next, 190 g of distilled water was added dropwise thereto for aqueous dispersion. Thereafter, the temperature in the reaction container was maintained at 85° C. under atmospheric pressure for 1 hour, the pressure in the reaction container was reduced, and isopropyl alcohol and methyl ethyl ketone were distilled off, thereby obtaining an aqueous dispersion of resin particles P1 (the concentration of solid contents: 30% by mass). The resin particles P1 had a Tg of 150° C. and a weight-average molecular weight of 50000.

(Synthesis of dispersant D1)

A dispersant D1 (resin dispersant) serving as a component in the ink was synthesized. Hereinafter, the details will be described.

The same mass of dipropylene glycol as the total amount of monomers described below was added to a three-neck flask equipped with a stirrer and a condenser and heated to 85° C. in a nitrogen atmosphere.

A solution I obtained by mixing 9.1 molar equivalents of stearyl methacrylate, 34.0 molar equivalents of benzyl methacrylate, 31.9 molar equivalents of hydroxyethyl methacrylate, 25.0 molar equivalents of methacrylic acid, and 0.8 molar equivalents of 2-mercaptopropionic acid and a solution II obtained by dissolving 1% by mass of t-butylperoxy-2-ethylhexanoate (Perbutyl O, manufactured by NOF Corporation) with respect to the total amount of the monomers in 20% by mass of dipropylene glycol with respect to the total amount of the monomers were respectively prepared. The solution I was added dropwise to the three-neck flask for 4 hours, and the solution II was added dropwise thereto for 5 hours.

After the completion of the dropwise addition, the resulting solution was allowed to further react for 2 hours, heated to 95° C., and heated and stirred for 3 hours so that all unreacted monomers were allowed to react. The disappearance of monomers was confirmed by the nuclear magnetic resonance method ($^1$H-NMR method).

The obtained reaction solution was heated to 70° C., 20.0 molar equivalents of dimethylaminoethanol (dimethylethanolamine) was added as an amine compound, propylene glycol was added thereto, and the resulting solution was stirred, thereby obtaining a 30 mass % solution of the dispersant D1.

The constituent components of the obtained polymer were confirmed by $^1$H-NMR. Further, the weight-average molecular weight (Mw) determined by GPC was 22000.

In addition, the mass ratio of respective constitutional units in the dispersant D1 (constitutional unit derived from stearyl methacrylate/constitutional unit derived from benzyl methacrylate/constitutional unit derived from hydroxyethyl methacrylate/constitutional unit derived from methacrylic acid) was 20/39/27/14. Here, the mass ratio does not include the mass of dimethylaminoethanol.

(Preparation of Pigment Dispersion)

A pigment dispersion was prepared in the following manner using a Lady Mill model LSG-4U-08 (manufactured by AIMEX Co., Ltd.).

Titanium dioxide particles (PF-690, manufactured by Ishihara Sangyo Kaisha, Ltd., average primary particle diameter of 210 nm) as a white pigment, a 30 mass % solution of the dispersant D1, and ultrapure water were added to a container made of zirconia. Further, 0.5 mmφ zirconia beads (Torayceram beads manufactured by Toray Industries, Inc.) (titanium dioxide particles:beads=1.125:1 (mass ratio)) were added thereto and the solution was mixed gently using a spatula.

The container made of zirconia was placed in a ball mill and dispersed at a rotation speed of 1000 rpm for 5 hours. After the completion of dispersion, the beads were removed by filtration with a filter cloth to obtain a pigment dispersion which was an aqueous pigment dispersion in which the concentration of the pigment was 45% by mass and the concentration of the dispersant D1 was 1.35% by mass.

(Preparation of Ink)

The aqueous dispersion (concentration of solid contents of 30% by mass) of the resin particles P1, the 30 mass % solution of the dispersant D1, and the components other than "the white pigment, the dispersant D1, and the resin particles P1" in the following composition were mixed, thereby preparing an ink having the following composition.

In Table 1, a total of the dispersant D1 and the resin particles P1 is defined as "the entire resin".

Ink Composition

- White pigment (titanium dioxide particles, average primary particle diameter of 210 nm) . . . 10% by mass
- Dispersant D1 (solid content of dispersant D1 in 30 mass% solution) . . . 0.3% by mass
- Resin particles P1 (solid content of resin particles P1 in aqueous dispersion) . . . 4% by mass
- Urea [Compound A] . . . 1% by mass
- Propylene glycol (manufactured by Fujifilm Wako Pure Chemical Corporation) [water-soluble solution] . . . 20% by mass
- SOLSPERSE (registered trademark) 43000 (manufactured by Noveon Inc.) [dispersion stabilizer] . . . 0.100% by mass
- Polyvinylpyrrolidone K15 (manufactured by Tokyo Chemical Industry Co., Ltd.) [water-soluble polymer compound] . . . 0.100% by mass
- SURFYNOL 104 (manufactured by Nissin Chemical Industry Co., Ltd.) [antifoaming agent] . . . 1.00% by mass
- SNOWTEX (registered trademark) XS (manufactured by Nissan Chemical Co., Ltd.) [colloidal silica] . . . 0.060% by mass
- BYK (registered trademark)-024 (manufactured by BYK-Chemie Japan KK) [antifoaming agent] . . . 0.01% by mass
- Water . . . remaining amount set such that total amount was 100% by mass The pH of the obtained ink was measured using a pH meter (MM-60R type, manufactured by DKK-TOA CORPORATION) under a temperature condition of 25° C., and the value listed in Table 1 was obtained.

<Preparation of Treatment Liquid>

A treatment liquid having the following composition was prepared.

Composition of Treatment Liquid
- Eastek (registered trademark) 1100 (manufactured by Eastman Chemical Company) [polyester resin particles] ... 10% by mass
- Malonic acid (manufactured by Fujifilm Wako Pure Chemical Corporation) [aggregating agent] ... 5% by mass
- Propylene glycol (manufactured by Fujifilm Wako Pure Chemical Corporation) [water-soluble solution] ... 10% by mass
- Water: remaining amount set such that total amount was 100% by mass The pH of the obtained treatment liquid was measured using a pH meter (MM-60R type, manufactured by DKK-TOA CORPORATION) under a temperature condition of 25° C., and the value listed in Table 1 was obtained.

<Image Recording>

Image recording was carried out in the following manner using an ink set comprising the above-described ink and the above-described treatment liquid.

A GELJET (registered trademark) GX5000 printer head (manufactured by Ricoh Co., Ltd.) was prepared as an ink jet head. The printer head is a line head in which 96 nozzles are arranged.

The printer head was fixedly disposed in an ink jet recording device having the same configuration as that of the ink jet recording device illustrated in FIG. 1 described above.

The disposition here was made such that the direction in which 96 nozzles were arranged was inclined by 75.7° with respect to a direction orthogonal to a movement direction of a stage of an ink jet device on the same plane.

A liquid-repellent film containing a fluorine compound is provided on the ink jetted surface of the line head. The liquid-repellent film containing a fluorine compound is a monolayer (SAM film) of $C_8F_{17}C_2H_4SiCl_3$.

A polyethylene terephthalate (PET) base material (FE2001, thickness of 12 μm, manufactured by Futamura Chemical Co., Ltd.) was prepared as an impermeable base material, and the treatment liquid adding step, the ink applying step, and the drying step described below were sequentially performed using the PET base material.

(Treatment Liquid Adding Step)

The PET base material was fixed onto the stage of the ink jet recording device, and the treatment liquid was applied onto the PET base material using a wire bar coater while the stage onto which the PET base material had been fixed was allowed to move in a linear direction at a constant speed of 500 mm/sec. The amount of the treatment liquid applied was 1.4 g/m².

The drying of the treatment liquid was started at a site where the application of the treatment liquid was completed, under a temperature condition of 50° C. using a dryer 1.5 seconds after the completion of the application of the treatment liquid to the site, and the drying was completed 3.5 seconds after the completion of the application of the treatment liquid. The drying time here was 2 seconds.

(Image Recording Step)

The ink was allowed to be jetted to the surface of the PET base material, onto which the treatment liquid had been applied, from the printer head according to the line system while the PET base material after the drying of the treatment liquid had been completed was allowed to move at a constant stage speed of 50 mm/sec, thereby forming a solid film. The amount of the ink applied was set to 11 g/m².

The jetting of the ink was started within 2 seconds from the completion of drying of the treatment liquid.

The ink was allowed to be jetted under the conditions of an ink droplet amount of 4.5 pL, a jetting frequency of 24 kHz, and a resolution of 1200 dpi×1200 dpi (dot per inch).

Further, an ink which was degassed through a degassing filter and in which the temperature thereof was adjusted to 30° C. was used as the ink.

Next, the ink applied onto the surface of the PET base material onto which the treatment liquid had been applied was dried at 70° C. for 10 seconds to obtain an image (specifically, a solid image).

In this manner, an image recorded material comprising the PET base material and the image disposed on the PET base material was obtained.

<Evaluation>

The following evaluations were performed on the image recorded material obtained in the above-described manner. The results are listed in Table 1.

(Covering Property)

The covering property of the solid image in the image recorded material was evaluated in the following manner.

Figure 2:
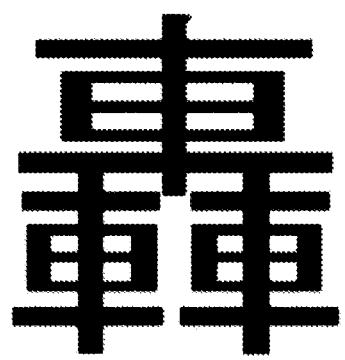
FIG. 2 is a black character image used for evaluating the covering property of images in examples.

Black character images (four in total) with sizes of 2 pt (point), 4 pt, 6 pt, and 8 pt were recorded on the PET base material separated from the image recorded material using a commercially available black inkjet ink, thereby obtaining a base material with black character images. The four black character images were all black character images illustrated in FIG. 2.

The image recorded material and the base material with black character images were overlapped with each other in an orientation in which non-image recorded surfaces (surfaces where the images were not recorded) were in contact to obtain a laminate. The obtained laminate was exposed to a 30 W fluorescent lamp such that the solid image faced the side of the evaluator, the evaluator confirmed whether the details of each black character image were able to be visually recognized through the solid image, and the covering property of the solid image was evaluated based on the following evaluation standards. Here, the distance between the eyes of the evaluator and the laminate was set to 20 cm, and the distance from the laminate to the fluorescent lamp was set to 2 m.

In the evaluation standards, the rank of the most excellent covering property of the solid image is "5".

Evaluation Standards for Covering Property Of Solid Image
- 5: The details of the black character images with sizes of 2 pt, 4 pt, 6 pt, and 8 pt were not able to be visually recognized.
- 4: The details of the black character image with a size of 8 pt were able to be visually recognized, but the details of the black character images with sizes of 2 pt, 4 pt, and 6 pt were not able to be visually recognized.
- 3: The details of the black character images with sizes of 6 pt and 8 pt were able to be visually recognized, but the details of the black character images with sizes of 2 pt and 4 pt were not able to be visually recognized.
- 2: The details of the black character images with sizes of 4 pt, 6 pt, and 8 pt were able to be visually recognized, but the details of the black character image with a size of 2 pt were not able to be visually recognized.
- 1: The details of the black character images with sizes of 2 pt, 4 pt, 6 pt, and 8 pt were able to be visually recognized.

(Adhesiveness)

A cross hatch test was performed on the image of the above-described image recorded material in conformity with ISO2409 (crosscut method), and the adhesiveness of the image was evaluated based on the following evaluation standards.

In the evaluation standards, the rank of the most excellent adhesiveness of the image is "5".

In the cross hatch test, the cut interval was set to 1 mm, and 25 square lattices having a size of 1 mm square were formed.

In the following evaluation standards, the percentage (%) of lattice peeling is a value acquired by the following equation. The total number of lattices in the following equation is 25.

Percentage (%) of lattice peeling=[(number of lattices which were peeled off)/(total number of lattices)]×100

Evaluation Standards for Temporal Adhesiveness of Image
5: The percentage (%) of lattice peeling was 0% or greater and 5% or less.
4: The percentage (%) of lattice peeling was greater than 5% and 15% or less.
3: The percentage (%) of lattice peeling was greater than 15% and 35% or less.
2: The percentage (%) of lattice peeling was greater than 35% and 65% or less.
1: The percentage (%) of lattice peeling was greater than 65%.

(Void Volume of Image)

The void volume of the image in the image recorded material was measured by the method described above.

An SEM image used for calculation of the void volume of the image was obtained using a Helios 400S FIB-SEM multifunction machine (manufactured by Thermo Fisher Scientific).

[Examples 2 to 28 and Comparative Examples 1 to 3]

The same operation as in Example 1 was performed except that the combination of the pH of the ink, the amount of the compound A in the ink, the amount of the resin (that is, the resin dispersant and the resin particles) in the ink, the Tg of the resin particles in the ink, the pH of the treatment liquid, the kind of the aggregating agent in the treatment liquid, and the amount of the treatment liquid applied was changed as listed in Table 1.

The results are listed in Table 1.

In the inks of Examples 2, 4, and 5 (pH of 7.5 or pH of 6.8), the pH of each ink was adjusted to be the value listed in Table 1 by replacing a part of water in the ink (pH of 8.5) of Example 1 with hydrochloric acid as a pH adjuster. In each of these inks, the content of the pH adjuster was less than 1% by mass with respect to the total amount of the ink.

In the treatment liquids of Examples 14 to 16, the pH of each treatment liquid was adjusted to 4.0 by replacing a part of water in the treatment liquid of Example 1 with hydrochloric acid as a pH adjuster. In each of these treatment liquids, the content of the pH adjuster was less than 1% by mass with respect to the total amount of the treatment liquid.

In Examples 12 and 13, the resin particles P1 (Tg=150° C.) in the ink of Example 1 were changed to the following resin particles P2 (Tg=60° C.) and the following resin particles P3 (Tg=0° C.).

Synthesis of Resin Particles P2 (Tg=60° C.) in Ink in Example 12

A three-neck flask provided with a stirrer, a thermometer, a reflux condenser, and a nitrogen gas introduction pipe was charged with methyl ethyl ketone (281 g) and heated to 85° C. A mixed solution formed of methyl methacrylate (120 g), isobornyl methacrylate (73 g), methacrylic acid (30 g), dodecyl methacrylate (75 g), methyl ethyl ketone (66 g), and "V-601" (manufactured by Fujifilm Wako Pure Chemical Corporation) (0.66 g) was added dropwise to the methyl ethyl ketone at a constant speed such that the dropwise addition was completed in 3 hours while the reflux state in the reaction container was maintained. After the completion of the dropwise addition, (1) the solution was stirred for 1 hour, a solution formed of "V-601" (0.66 g) and methyl ethyl ketone (3.5 g) was added thereto, and the resulting solution was stirred for 2 hours. Subsequently, the step of (1) was repeated four times, and a solution formed of "V-601" (0.66 g) and methyl ethyl ketone (3.5 g) was further added thereto, and the resulting solution was continuously stirred for 3 hours. After the temperature was lowered to 60° C., isopropyl alcohol (83 g) was added thereto.

Next, 155 g of the polymerization solution (the concentration of solid contents: 40% by mass) was weighed, and methyl ethyl ketone (7 g), isopropyl alcohol (23.1 g), a 20% maleic acid anhydride aqueous solution (0.6 g), and 2 mol/L of a sodium hydroxide (NaOH) aqueous solution (20 g) were added, and the temperature inside the reaction container was raised to 70° C. Next, 190 g of distilled water was added dropwise thereto for aqueous dispersion. Thereafter, the temperature in the reaction container was maintained at 85° C. under atmospheric pressure for 1 hour, the pressure in the reaction container was reduced, and isopropyl alcohol and methyl ethyl ketone were distilled off, thereby obtaining an aqueous dispersion of resin particles P2 (the concentration of solid contents: 30% by mass). The resin particles P2 had a Tg of 60° C. and a weight-average molecular weight of 65000.

Preparation of resin particles P3 (Tg=0° C.) in ink in Example 13

A three-neck flask provided with a stirrer, a thermometer, a reflux condenser, and a nitrogen gas introduction pipe was charged with methyl ethyl ketone (281 g) and heated to 85° C. A mixed solution formed of methyl methacrylate (60 g), isobornyl methacrylate (43 g), methacrylic acid (30 g), dodecyl methacrylate (165 g), methyl ethyl ketone (66 g), and "V-601" (manufactured by Fujifilm Wako Pure Chemical Corporation) (0.66 g) was added dropwise to the methyl ethyl ketone at a constant speed such that the dropwise addition was completed in 3 hours while the reflux state in the reaction container was maintained. After the completion of the dropwise addition, (1) the solution was stirred for 1 hour, a solution formed of "V-601" (0.66 g) and methyl ethyl ketone (3.5 g) was added thereto, and the resulting solution was stirred for 2 hours. Subsequently, the step of (1) was repeated four times, and a solution formed of "V-601" (0.66 g) and methyl ethyl ketone (3.5 g) was further added thereto, and the resulting solution was continuously stirred for 3 hours. After the temperature was lowered to 60° C., isopropyl alcohol (83 g) was added thereto.

Next, 155 g of the polymerization solution (the concentration of solid contents: 40% by mass) was weighed, and methyl ethyl ketone (7 g), isopropyl alcohol (23.1 g), a 20% maleic acid anhydride aqueous solution (0.6 g), and 2 mol/L of a sodium hydroxide (NaOH) aqueous solution (20 g) were added, and the temperature inside the reaction container was raised to 70° C. Next, 190 g of distilled water was added dropwise thereto for aqueous dispersion. Thereafter, the temperature in the reaction container was maintained at 85° C. under atmospheric pressure for 1 hour, the pressure in the reaction container was reduced, and isopropyl alcohol and methyl ethyl ketone were distilled off, thereby obtaining an aqueous dispersion of resin particles P3 (the concentration of solid contents: 30% by mass). The resin particles P3 had a Tg of 0° C. and a weight-average molecular weight of 70000.

TABLE 1

| | | Ink | | | | | | | | Treatment liquid | | Relationship between ink and treatment liquid | | Evaluation result | | |
|---|---|---|---|---|---|---|---|---|---|---|---|---|---|---|---|---|
| | pH | Amount of white pigment (%) | Amount of compound A (%) | Tg of resin particles (°C) | Amount of entire resin (%) | White pigment/ compound A | Entire resin/ compound A | (White pigment + entire resin)/ compound A | Application amount Y (g/m²) | pH | Aggregation agent | Application amount X (g/m²) | Absolute value of difference in pH | Ratio of Y/X | Covering property | Adhesiveness | Void volume of image (%) |
| Example 1 | 8.5 | 10 | 1 | 150 | 4.3 | 10 | 4.3 | 14.3 | 11 | 4.0 | Malonic acid | 1.4 | 4.5 | 7.9 | 5 | 5 | 12 |
| Example 2 | 7.5 | 10 | 1 | 150 | 4.3 | 10 | 4.3 | 14.3 | 11 | 10.5 | — | 1.4 | 3.0 | 7.9 | 3 | 5 | 12 |
| Example 3 | 8.5 | 10 | 1 | 150 | 4.3 | 10 | 4 | 14 | 11 | 4.0 | — | 1.4 | 4.5 | 7.9 | 3 | 5 | 12 |
| Example 4 | 7.5 | 10 | 1 | 150 | 4.3 | 10 | 4 | 14 | 11 | 10.5 | Cationic polymer 1 | 1.4 | 3.0 | 7.9 | 4 | 5 | 12 |
| Example 5 | 6.8 | 10 | 1 | 150 | 4.3 | 10 | 4.3 | 14.3 | 11 | 4.0 | Malonic acid | 1.5 | 2.8 | 7.3 | 2 | 4 | 2 |
| Example 6 | 8.5 | 10 | 1 | 150 | 0.2 | 10 | 0.2 | 10.2 | 11 | 4.0 | Malonic acid | 1.5 | 4.5 | 7.3 | 5 | 2 | 28 |
| Example 7 | 8.5 | 10 | 0.1 | 150 | 12 | 100 | 120 | 220 | 11 | 4.0 | Malonic acid | 1.5 | 4.5 | 7.3 | 2 | 5 | 1.2 |
| Example 8 | 8.5 | 10 | 2 | 150 | 1 | 5 | 0.5 | 5.5 | 11 | 4.0 | Malonic acid | 1.5 | 4.5 | 7.3 | 5 | 3 | 25 |
| Example 9 | 8.5 | 10 | 0.065 | 150 | 6 | 154 | 92 | 246 | 11 | 4.0 | Malonic acid | 1.5 | 4.5 | 7.3 | 3 | 5 | 5 |
| Example 10 | 8.5 | 10 | 1 | 150 | 0.1 | 10 | 0.1 | 10 | 11 | 4.0 | Malonic acid | 1.5 | 4.5 | 7.3 | 4 | 3 | 9 |
| Example 11 | 8.5 | 10 | 0.07 | 150 | 4.3 | 143 | 61 | 204 | 11 | 4.0 | Malonic acid | 1.5 | 4.5 | 7.3 | 3 | 5 | 6 |
| Example 12 | 8.5 | 10 | 1 | 60 | 4.3 | 10 | 4.3 | 14.3 | 11 | 4.0 | Malonic acid | 1.5 | 4.5 | 7.3 | 5 | 3 | 23 |
| Example 13 | 8.5 | 10 | 1 | 0 | 4.3 | 10 | 4.3 | 14.3 | 11 | 4.0 | Malonic acid | 1.5 | 4.5 | 7.3 | 5 | 2 | 27 |
| Example 14 | 8.5 | 10 | 1 | 150 | 4.3 | 10 | 4.3 | 14.3 | 11 | 4.0 | $CaCl_2$ | 1.5 | 4.5 | 7.3 | 4 | 5 | 8 |
| Example 15 | 8.5 | 10 | 1 | 150 | 4.3 | 10 | 4.3 | 14.3 | 11 | 4.0 | Metal complex 1 | 1.5 | 4.5 | 7.3 | 3 | 5 | 7 |
| Example 16 | 8.5 | 10 | 1 | 150 | 4.3 | 10 | 4.3 | 14.3 | 11 | 4.0 | Cationic polymer 1 | 1.5 | 4.5 | 7.3 | 3 | 5 | 7 |
| Example 17 | 8.5 | 10 | 1 | 150 | 4.3 | 10 | 4.3 | 14.3 | 11 | 4.0 | Malonic acid | 4.0 | 4.5 | 2.8 | 4 | 3 | 9 |
| Example 18 | 8.5 | 10 | 1 | 150 | 4.3 | 10 | 4.3 | 14.3 | 11 | 4.0 | Malonic acid | 0.4 | 4.5 | 27.5 | 3 | 4 | 6 |
| Example 19 | 8.5 | 10 | 0.2 | 150 | 4.3 | 50 | 22 | 72 | 11 | 4.0 | Malonic acid | 1.4 | 4.5 | 7.9 | 4 | 5 | 9 |
| Example 20 | 8.5 | 10 | 0.5 | 150 | 4.3 | 20 | 9 | 29 | 11 | 4.0 | Malonic acid | 1.4 | 4.5 | 7.9 | 5 | 5 | 12 |
| Example 21 | 8.5 | 10 | 2 | 150 | 4.3 | 5.0 | 2.2 | 7.2 | 11 | 4.0 | Malonic acid | 1.4 | 4.5 | 7.9 | 5 | 5 | 15 |
| Example 22 | 8.5 | 10 | 4 | 150 | 4.3 | 3 | 1.1 | 3.6 | 11 | 4.0 | Malonic acid | 1.4 | 4.5 | 7.9 | 5 | 4 | 18 |
| Example 23 | 8.5 | 10 | 2 | 150 | 5 | 5 | 2.5 | 7.5 | 11 | 4.0 | Malonic acid | 1.4 | 4.5 | 7.9 | 5 | 4 | 20 |
| Example 24 | 8.5 | 10 | 2 | 150 | 7 | 5 | 3.5 | 8.5 | 11 | 4.0 | Malonic acid | 1.4 | 4.5 | 7.9 | 5 | 5 | 10 |
| Example 25 | 8.5 | 10 | 1 | 150 | 4.3 | 10 | 4.3 | 14.3 | 11 | 4.0 | Malonic acid | 2.0 | 4.5 | 5.5 | 5 | 4 | 18 |
| Example 26 | 8.5 | 10 | 1 | 150 | 4.3 | 10 | 4.3 | 14.3 | 11 | 4.0 | Malonic acid | 0.8 | 4.5 | 13.8 | 4 | 5 | 8 |
| Example 27 | 8.5 | 10 | 1 | 150 | 4.3 | 10 | 4.3 | 14.3 | 11 | 4.0 | Malonic acid | 1.6 | 4.5 | 6.9 | 5 | 5 | 14 |
| Example 28 | 8.5 | 10 | 1 | 150 | 4.3 | 10 | 4.3 | 14.3 | 11 | 4.0 | Malonic acid | 1.2 | 4.5 | 9.2 | 5 | 5 | 12 |

TABLE 1-continued

| | | Ink | | | | | | | | Treatment liquid | | Relationship between ink and treatment liquid | | Evaluation result | | |
|---|---|---|---|---|---|---|---|---|---|---|---|---|---|---|---|---|
| | pH | Amount of white pigment (%) | Amount of compound A (%) | Tg of resin particles (° C.) | Amount of entire resin (%) | White pigment/compound A | Entire resin/compound A | (White pigment + entire resin)/compound A | Application amount Y (g/m²) | pH | Aggregation agent | Application amount X (g/m²) | Absolute value of difference in pH | Ratio of Y/X | Covering property | Adhesiveness | Void volume of image (%) |
| Comparative Example 1 | 8.5 | 10 | 1 | 150 | 4.3 | 10 | 4.3 | 14.3 | 11 | 6.0 | Malonic acid | 1.4 | 2.5 | 7.9 | 1 | 3 | 0.8 |
| Comparative Example 2 | 8.5 | 10 | 0.05 | 150 | 4.3 | 200 | 86 | 286 | 11 | 4.0 | Malonic acid | 1.5 | 4.5 | 7.3 | 1 | 5 | 0.4 |
| Comparative Example 3 | 8.5 | 10 | 12 | 150 | 4.3 | 0.83 | 0.36 | 1.19 | 11 | 4.0 | Malonic acid | 1.5 | 4.5 | 7.3 | 5 | 1 | 40 |

Explanation of Table 1

The amount of the components in the ink indicates the content (% by mass) thereof with respect to the entire ink, and the amount of the components in the treatment liquid indicates the content (% by mass) thereof with respect to the entire treatment liquid.

The "entire resin" indicates all the resin components obtained by combining the resin dispersant and the resin particles.

The white pigment indicates titanium dioxide particles.

The compound A indicates urea.

The "white pigment/compound A" indicates the ratio of the content mass of the white pigment to the content mass of the compound A.

The "entire resin/compound A" indicates the ratio of the content mass of the entire resin (that is, the resin dispersant and the resin particles) to the content mass of the compound A.

The "(white pigment+entire resin)/compound A" indicates the ratio of the total content mass of the white pigment and the entire resin (that is, the resin dispersant and the resin particles) to the content mass of the compound A.

The ratio of Y/X indicates the ratio of Y to X in a case where the amount of the treatment liquid applied per unit area in the treatment liquid adding step is defined as X g/m² and the amount of the ink applied per unit area in the image recording step is defined as Y g/m².

In Table 1, the specific pH adjusters in the treatment liquid are as follows.

Malonic acid . . . malonic acid (manufactured by Fujifilm Wako Pure Chemical Corporation)

$CaCl_2$ . . . . $CaCl_2$ (manufactured by Fujifilm Wako Pure Chemical Corporation)

Metal complex 1 . . . titanium lactate (ORGATIX TC-310, manufactured by Matsumoto Fine Chemical Co., Ltd.)

Cationic polymer 1 . . . poly-2-hydroxypropyldimethylammonium chloride (CATIOMASTER PD-7 (manufactured by Yokkaichi Chemical Co., Ltd.)

As listed in Table 1, in each example in which the ink set comprising a treatment liquid having a pH of 4.5 or less or 9.5 or greater, and an ink containing a compound A generating gas in an environment of a pH of 4.5 or less or 9.5 or greater, a resin, water, and a white pigment and having a pH of greater than 4.5 and less than 9.5, in which the white pigment/compound A (that is, the ratio of the content mass of the white pigment to the content mass of the compound A) in the ink was 1 or greater and 160 or less, was used, the covering property and the adhesiveness of the recorded image were excellent.

In each of Comparative Example 1 in which the pH of the treatment liquid was greater than 4.5 and less than 9.5 and Comparative Example 2 in which the white pigment/compound A was 160 or greater, the covering property of the image was degraded as compared to each of the examples. The reason for this is considered to be that gas due to the compound A was not generated and the void volume in the image was lowered.

Further, in Comparative Example 3 in which the white pigment/compound A was less than 1, the adhesiveness of the image was degraded. The reason for this is considered to be that the void volume in the image was extremely high.

As shown in the results of Examples 1 to 5, it was found that in a case where the absolute value of the difference between the pH of the treatment liquid and the pH of the ink was 3 or greater (Examples 1 to 4), the covering property of the image was further improved.

As shown in the results of Examples 6 and 8, it was found that in a case where the entire resin/compound A in the ink was 0.3 or greater (Example 8), the adhesiveness of the image was further improved.

As shown in the results of Examples 7 and 9, it was found that in a case where the entire resin/compound A in the ink was 100 or less (Example 9), the covering property of the image was further improved.

As shown in the results of Examples 12 and 13, it was found that in a case where the glass transition temperature (Tg) of the resin particles was 40° C. or higher (Example 12), the adhesiveness of the image was further improved.

As shown in the results of Examples 1, 4, and 14 to 16, it was found that in a case where the treatment liquid contained an organic acid as an aggregating agent (Example 1), the covering property of the image was further improved.

EXPLANATION OF REFERENCES

11: supply unit
12: treatment liquid applying unit
13: treatment liquid drying zone
14: ink jetting unit
15: ink drying zone
16: accumulation unit
20: anilox roller
22: coating roller
24: opposing roller
30W, 30K, 30C, 30M, 30Y, 30A: ink jet head
41, 42, 43, 44, 45, 46: transport roller

What is claimed is:

1. An ink set comprising:
a treatment liquid having a pH of 4.5 or less or 9.5 or greater; and
an ink containing a compound A which generates gas in an environment of a pH of 4.5 or less or 9.5 or greater, a resin, water, and a white pigment and having a pH of greater than 4.5 and less than 9.5,
wherein a ratio of a content mass of the white pigment to a content mass of the compound A in the ink is 2 or greater and 160 or less, and
a ratio of a total content mass of the white pigment and the resin to the content mass of the compound A in the ink is 6 or greater and 250 or less.

2. The ink set according to claim 1,
wherein an absolute value of a difference between the pH of the treatment liquid and the pH of the ink is 3 or greater.

3. The ink set according to claim 1,
wherein a ratio of a content mass of the resin to the content mass of the compound A in the ink is 0.3 or greater and 100 or less.

4. The ink set according to claim 1,
wherein a ratio of a total content mass of the white pigment to the content mass of the compound A in the ink is 3 or greater.

5. The ink set according to claim 1,
wherein the compound A is urea.

6. The ink set according to claim 1,
wherein a content of the white pigment in the ink is in a range of 5% by mass to 20% by mass with respect to a total amount of the ink.

7. The ink set according to claim 1,
wherein the white pigment contains titanium dioxide particles.

8. The ink set according to claim 1,
wherein the ink is a white ink.

9. The ink set according to claim 1,
wherein a content of the resin is in a range of 1% by mass to 10% by mass with respect to a total amount of the ink, and
a content of the compound A is in a range of 0.1% by mass to 10% by mass with respect to the total amount of the ink.

10. The ink set according to claim 1,
wherein the resin contains resin particles.

11. The ink set according to claim 10,
wherein a glass transition temperature of the resin particles is 40° C. or higher.

12. The ink set according to claim 1,
wherein the ink is an inkjet ink.

13. The ink set according to claim 1,
wherein the treatment liquid contains at least one aggregating agent selected from the group consisting of an organic acid, a polyvalent metal compound, a metal complex, and a water-soluble cationic polymer.

14. The ink set according to claim 1,
wherein the ink set is used for recording an image on an impermeable base material.

15. An image recording method using the ink set according to claim 1, the method comprising:
a step of applying the treatment liquid on an impermeable base material; and
a step of recording an image by applying the ink onto a surface of the impermeable base material onto which the treatment liquid has been applied.

16. The image recording method according to claim 15,
wherein in a case where an amount of the treatment liquid to be applied per unit area in the step of applying the treatment liquid is defined as X g/m² and an amount of the ink to be applied per unit area in the step of recording the image is defined as Y g/m², a ratio of Y/X is 3 or greater and 25 or less.

* * * * *